United States Patent [19]

Sakai et al.

[11] Patent Number: 5,305,159
[45] Date of Patent: Apr. 19, 1994

[54] MAGNETIC DISK APPARATUS

[75] Inventors: Yuji Sakai, Yokohama; Takehito Yamada, Kawasaki; Katsuyoshi Kitagawa, Urayasu, all of Japan

[73] Assignee: Kabushiki Kaisha Toshiba, Kawasaki, Japan

[21] Appl. No.: 741,069

[22] Filed: Aug. 6, 1991

[30] Foreign Application Priority Data

| Aug. 8, 1990 | [JP] | Japan | 2-208038 |
| Aug. 8, 1990 | [JP] | Japan | 2-208039 |
| Aug. 8, 1990 | [JP] | Japan | 2-208040 |
| Nov. 5, 1990 | [JP] | Japan | 2-297237 |

[51] Int. Cl.$^5$ ............................................. G11B 5/596
[52] U.S. Cl. ......................... 360/77.02; 360/77.03; 360/77.04; 360/77.08
[58] Field of Search ............ 360/77.02, 77.04, 77.08, 360/98.01, 105, 77.03

[56] References Cited

U.S. PATENT DOCUMENTS

| 3,534,344 | 10/1970 | Santana | 360/77.02 |
| 4,748,609 | 5/1988 | Yonezawa et al. | 360/105 |
| 4,907,214 | 3/1990 | Nagano et al. | 360/77.04 |
| 5,010,430 | 4/1991 | Yamada et al. | 360/77.08 |
| 5,023,733 | 6/1991 | Koga et al. | 360/77.04 |
| 5,084,661 | 1/1992 | Tanaka | 360/98.01 |

FOREIGN PATENT DOCUMENTS 1-248368 10/1989 Japan .
2-118979 5/1990 Japan .

Primary Examiner—William L. Sikes
Assistant Examiner—Trong Phan
Attorney, Agent, or Firm—Oblon, Spivak, McClelland, Maier & Neustadt

[57] ABSTRACT

A disk system has a disk as a recording medium, and a disk recording/reproducing apparatus for recording and reproducing data by a head radially movable provided on a disk by a head moving mechanism, and the disk has a first region formed with a servo sector having servo information along a data track for recording and reproducing data on a disk, second regions having servo sectors having servo information along a servo track and of the number of magnification of integer number of the servo sectors in the first region, and the disk recording/reproducing apparatus has, position detecting section placed on the moving portion of the head moving mechanism for detecting the moving position of a head to output a position signal representing the head position in the radial direction of the disk, memory section for storing "head follow-up information" for a servo track obtained from the position signal in the state that the head is positioned on the servo track, and section for controlling to follow up the head to the data track by using "first track follow-up error information" obtained by servo information read from the servo sector immediately after the head is passed over the servo sector in the first region when the head is positioned on the data track, and using "second track follow-up error information" of a difference between the follow-up information of the head to the data track obtained from the position signal and follow-up information stored in the memory section while the head is passed between servo sectors in the first region.

7 Claims, 27 Drawing Sheets

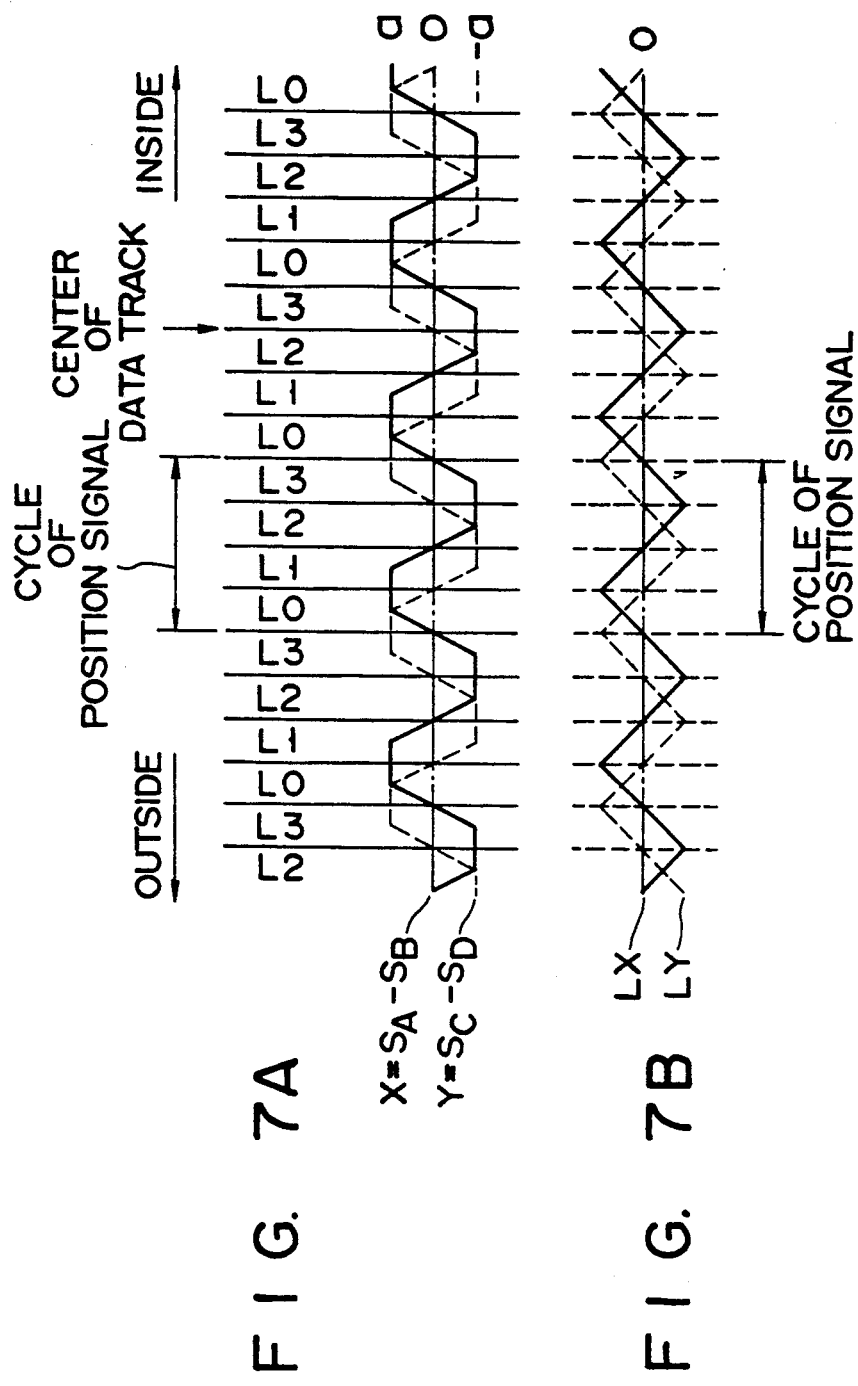

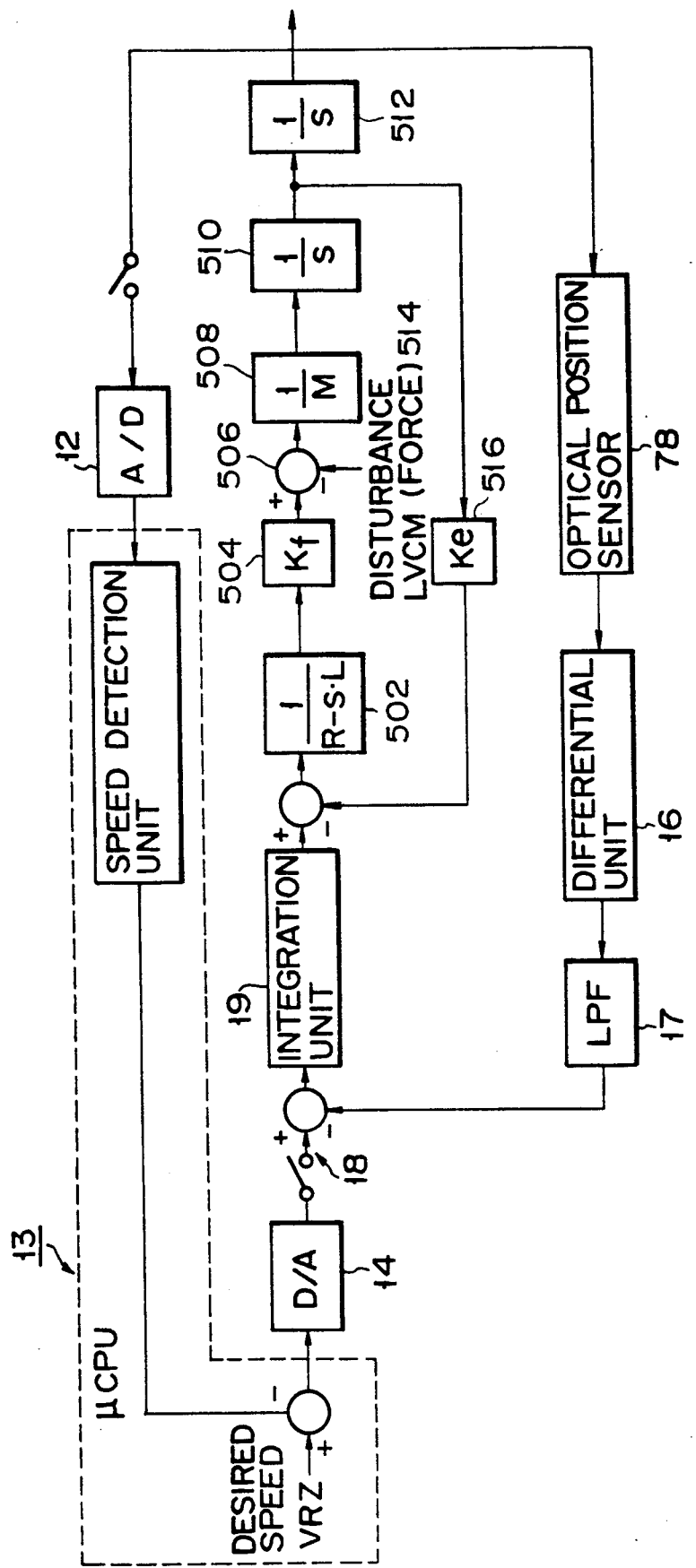
F I G. 20

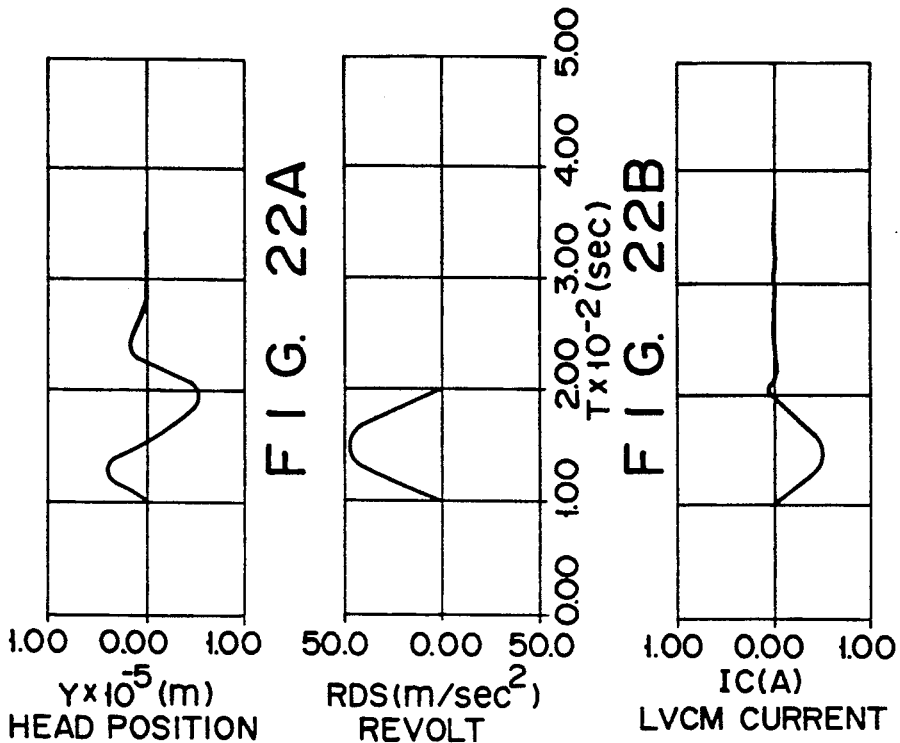
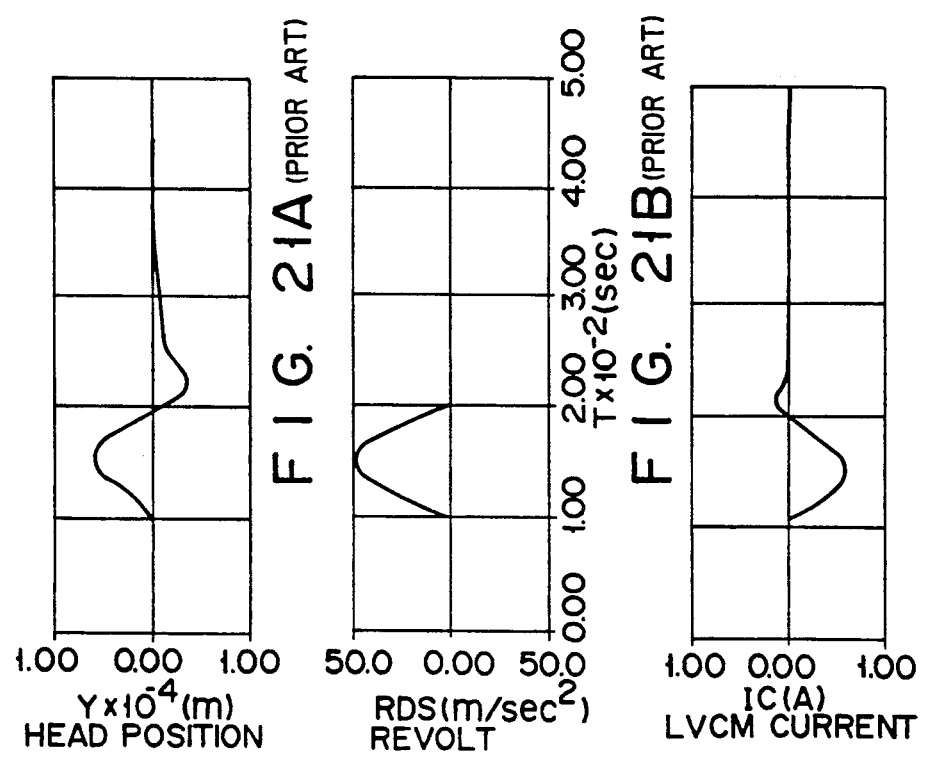

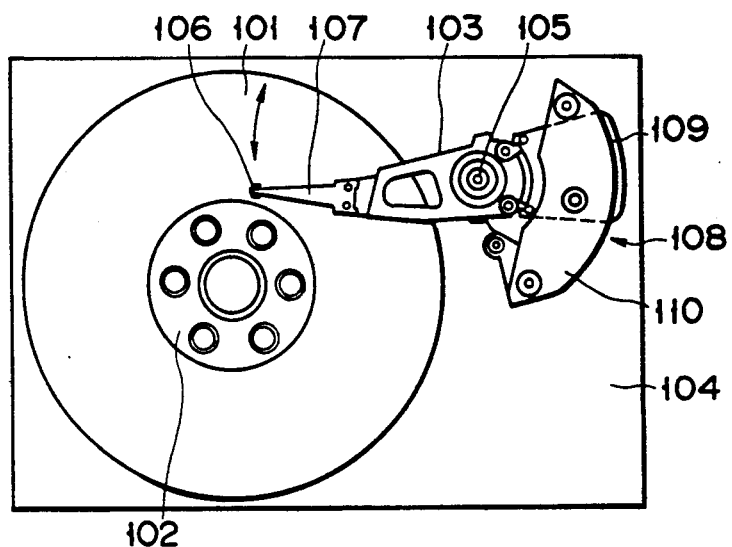
FIG. 35
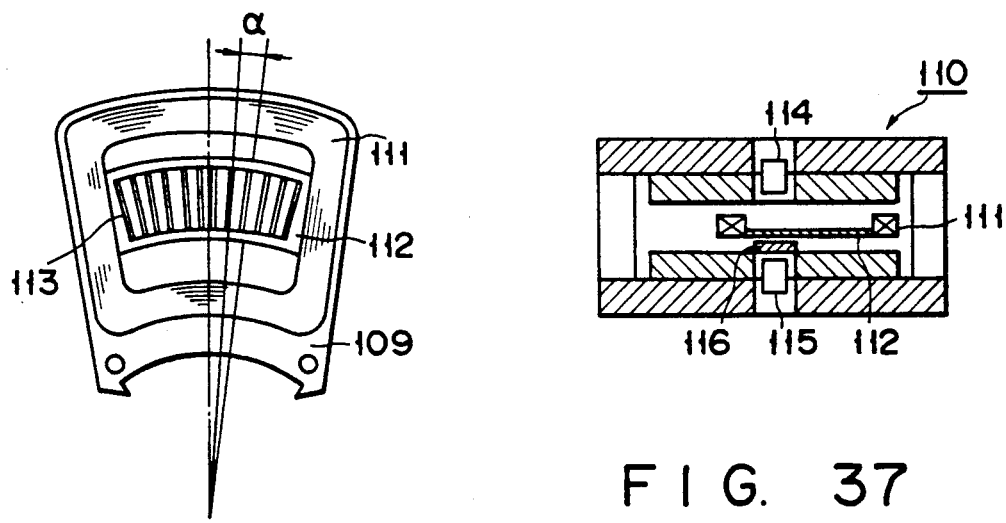
FIG. 36
FIG. 37

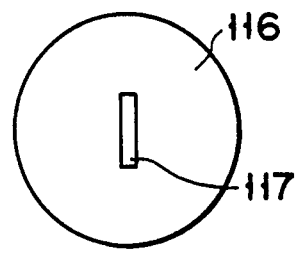
F I G. 38
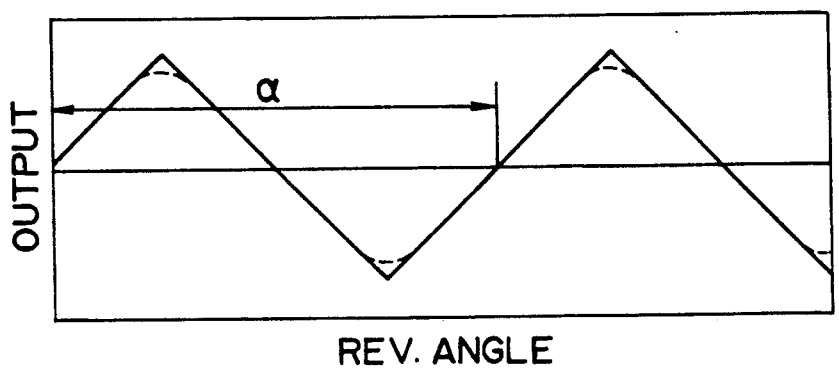
F I G. 39
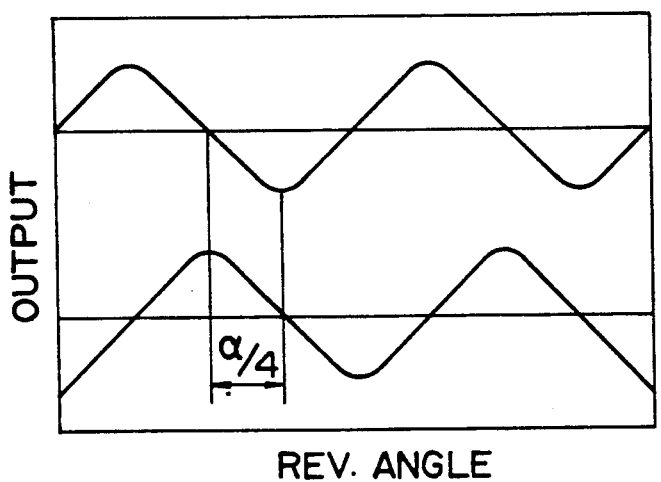
F I G. 40

MAGNETIC DISK APPARATUS

BACKGROUND OF THE INVENTION

1. Field of the Invention

The present invention relates to a disk system for recording and reproducing data by using a disk-like recording medium such as a magnetic disk and, more particularly, to a disk system for positioning a head on a data track in accordance with servo information formed on a portion of a sector on a data recording surface.

2. Description of the Related Art

In a conventional magnetic disk apparatus, "servo information" for "positioning" a magnetic head on a magnetic disk is previously formed so as to raise the density of tracks. In the magnetic disk apparatus, an accessing system for suitably positioning a magnetic head in accordance with the servo information is employed. "A sector servo system" is known as one type for positioning the magnetic head as described above. In the magnetic disk which employs the "sector servo system", servo information formed of a pattern repeated at a predetermined cycle is formed in advance on a portion of a sector (e.g., a servo sector) on the track. The servo information is read by the magnetic head, and a position error signal indicating a position error of a head with respect to a desired track is generated by sampling by using a sampling cycle to be determined in accordance with the number of sectors and the rotating speed of the disk. The position of the magnetic head is controlled so that the position error signal becomes minimum.

A small-sized hard disk apparatus or a floppy disk apparatus of magnetic disk apparatuses is frequently placed in a portable personal computer or the like. An external vibration of impact is easily applied to the apparatus. It is difficult to accurately follow a head to a mark track by holding a complete head positioning state against such a vibration or an impact. Therefore, the disk is heretofore constructed so as to obtain servo information in terms of data recording region (i.e., magnetic region) as many as possible thereby to widen the servo band, thereby improving "vibration-proof performance". The "positioning accuracy" is obtained by mounting the entire magnetic disk in a vibration removing mechanism.

In the above-described sector servo system, however, the position error signal of the magnetic head cannot be obtained between the sector and the sector. Thus, when the number of the servo sectors is suppressed so as to improve a format efficiency, a cycle in which the position error signal cannot be obtained is lengthened. Therefore, the follow-up performance of the magnetic head to a mark track (so-called track follow-up performance) against a disturbance such as an impact or a vibration or the responsivity of the magnetic head (i.e., disturbance suppressing characteristic) when the head is deviated from a mark track due to a disturbance, is deteriorated. As a result, there arises a problem that, since an accurate "positioning operation" cannot be maintained, positioning characteristic is lowered.

In a sample-data control system, a "phase lag" due to sample/hold generally occurs. In order to eliminate the influence of the phase lag to a control system, it is necessary to limit the servo band to approximately 1/7 or less of a sampling frequency. If the servo band is limited as described above, utility in a frequency band where "a disturbance" exists is lowered, and hence vibration-proof performance is deteriorated.

On the other hand, in order to position a head in a magnetic disk apparatus and particularly a hard disk apparatus, a "data surface servo system" represented by a "sector servo system" has been employed instead of a "servo surface servo system" heretofore frequently used. And the data surface servo system is also employed by a large capacity flexible magnetic disk apparatus in order to improve the track density. The data surface servo system does not used an exclusive use servo surface like the servo surface servo system, but writes (records) servo information on a data surface, and does not have a thermal offtrack which becomes a problem in the servo surface servo system but can obtain servo information (i.e, position information) directly from a data track. Therefore, the data surface servo system has an advantage that an accurate "head positioning" can be achieved.

In the conventional sector servo system, as shown in FIG. 4, a servo sector 33 is provided on a partial region of a sector on a data surface of a disk 1, i.e., between data sectors 32. A servo pattern 31 for applying head position information of radial direction of the disk is formed in advance on the servo sector 33. A head for recording and reproducing data intermittently read the servo pattern 31 at each servo sector 33. A position signal as shown in FIG. 5 is, for example, decoded from the information of the servo pattern 31 thus intermittently obtained, and the head is controlled to be positioned in accordance with the position signal dispersively obtained at each sector.

In a disk apparatus using such a sector servo system as a head positioning servo, or particularly in a large capacity flexible magnetic disk apparatus, it is necessary to obtain a sufficient servo band so as to follow up the head to "track radial runout" generated due to "eccentricity" generated upon elongation or contraction of a medium due to temperature and moisture changes or replacement of a disk (i.e., the track radial runout of a primary mode having a frequency equal to the rotating frequency of the disk or the track radial run-out of a secondary mode having twice the frequency) and to accurately position the head to a data track. Therefore, a wide servo band is realized to strengthen the head against a disturbance such as a vibration, an impact, etc., and to obtain faster "settling time".

The sector servo type disk apparatus has a "sampled-data control system". Therefore, in order to obtain a wide servo band, its sampling frequency may be set to a high value. As a method of obtaining a wide servo band by increasing the sampling frequency, there are generally the following methods:

(Method A): A method of accelerating the rotating speed of a disk (Method B): A method of increasing the number of servo sectors (i.e., generally equal to the number of data sectors)

In the (method A) for accelerating the rotating speed of the disk, since the fluctuating frequency of the track is proportionally raised, the "follow-up performance of the head" against the fluctuation of the track is not improved. Therefore, in order to generally improve the performance of the disk system, it is most effectively to employ the (method B) to increase the number of servo sectors and to increase the quantity of the servo information. However, if the number of servo sectors is increased, better head positioning control is performed, but "format efficiency" (i.e., formatted capacity to unformatted capacity ratio) is reversely decreased. Thus, the storage capacity of the data to be actually recorded is reduced. Therefore, it is difficult to obtain sufficient storage capacity and to simultaneously attain the number of sectors to obtain a sufficient servo band only by the methods A and B.

In the conventional "sector servo system", as shown, for example, in FIG. 14, a servo pattern 31 repeated in a predetermined cycle radially of a disk is previously formed as "servo information" on a partial region of a sector on a disk, i.e., on a servo sector 33 provided intermittently between data sectors 32, the position signal of the head obtained by reading the servo pattern 31 is decoded to control to position a head 35. The servo pattern 31 has a position information portion 34, which has information bits A, B, C and D for obtaining two-phase position signals X and Y used to accurately follow up the head 35 to a data track, and information bits P, Q and R for enhancing the position detecting ability of the head 35 by using the position signals X and Y to detect the position even if the head 35 is moved faster.

FIG. 15 shows a position signal obtained by decoding the servo pattern 31. When the amplitude values of the signals obtained by reading the information bits A, B, C, D and P, Q, R by the head 35 as the head 35 passes over the servo pattern 31 are defined as SA, SB, SC, SC and SP, SQ, SR, respectively, $X = SA - SB$, $Y = SC - SD$ are satisfied. The position signals X and Y are used as analog signals, while the SP, SQ and SR are binarized, and used as digital signals of "1" or "0". In the case of controlling to follow up a track, the position signals X and Y are used. The position where they become "0" is used as a data track center, a feedback control is performed so that $X = 0$ or $Y = 0$ is obtained, thereby following up the head to the data track. In the case of seeking the head to a target track, the position and the speed of the head are obtained from the signals X, Y, SP, SQ and SR, and the head is controlled at its speed in accordance with a desired speed previously set in response to the distance to a target track. A head position detecting method first determines the magnitude of the X and Y to determine the zone L0, L1, L2, L3 where the head exists. More specifically, it is determined in accordance with the criterion of the following formulae:

$X \geq 0, Y > 0 \rightarrow L0$ $X > 0, Y \leq 0 \rightarrow L1$ $X \leq 0, Y < 0 \rightarrow L2$ $X < 0, Y \geq 0 \rightarrow L3$ Then, second position signal groups $U = X + Y$, $V = X - Y$ are respectively obtained from the signals X and Y. Further, positions D0, D1, D2 and D3 in the zones L0, L1, L2 and L3 determined previously are obtained from the signals U and V as below, where $\pm a$ is the amplitude value of the signals X and Y shown in FIG. 15

$L0 : D0 = V/(2a) + 0.5$ $L1 : D1 = 0.5 - U/(2a)$ $L2 : D2 = 0.5 - V/(2a)$ $L3 : D3 = U/(2a) + 0.5$

In the above-described "head positioning method", the condition that the head is moved within four track zones including the zone where the head exists at present between samplings is set in advance, thereby detecting the head position without error.

For example, (a): in FIG. 15, the head is moved to the inside, and it is assumed that the head is not returned to the outside. At this time, if the head is in the zone Ln by sampling at an arbitrary servo sector, a range that the move can move up to the sampling in next servo sector is limited within four zones of the inside including the Ln (e.g., if Ln = L0, within the zones L0 to L3), and the position can be detected under the condition without error.

(b): It is assumed that the head is moved to the inside and the head might be returned at one track to the outside in the worst case. If the head is in the zone Ln by sampling at an arbitrary servo sector, a range that the head can move to the sampling in next servo sector is limited within three zones of the inside including one zone of the outside of the Ln and Ln (e.g., if Ln = L0, within the zones L13 to L0 to L2), and the position can be detected under the condition without error. Therefore, in the former case (a), the range that the head can move between continuous sampling points (i.e., time for detecting the two continuous servo sectors by the head, i.e., the time equal to the servo sector detecting cycle), i.e., an allowable maximum moving speed is limited to less than three track pitch per time equal to servo sector detecting cycle. In the latter case (b), the range becomes less than two track pitch.

When the signals of SP, SQ and SR having further longer repetition cycle are used together, sixteen track zones of L0 to L15 can be identified, and the position of the head within the sixteen tracks can be unitarily identified. In the case (a) of this case, the allowable maximum moving speed is limited to less than fifteen track pitch per time equal to the servo sector detecting cycle. In the case (b), the allowable maximum moving speed is limited to less than fourteen track pitch. Thus, the allowable value of the maximum speed of the head can be enhanced by adding information bits P, Q, and R to the position information portion 34 of the servo pattern 31. In order to obtain the position of the head, the "0" track is first detected, the present position of the head is determined from position information obtained by the previous sampling and the position information obtained by the present sampling by the restriction that the moving speed of the head is within the allowable maximum moving speed, the positions to be determined at each sampling from the "0" track position are accumulated and calculated to obtain the present position of the head.

As described above, the pattern repeated at a predetermined cycle is formed, and the position of the head can be unitarily identified within the cycle. Further, the present position of the head can be detected by the position obtained by the previous sampling and the servo information obtained by the present sampling by the restriction that the distance for moving the head between the two sampling points is within the cycle or less. This head position detecting method is known as so-called "a relative position detecting method".

On the other hand, as the other conventional head position detecting method, there is known an "absolute position detecting method" in which servo information such as a Gray code to be unitarily identified from servo information is formed when the servo information is detected irrespective of the information of the previous position where the present head is disposed at any track and at any position in the track.

However, according to the above-described relative position detecting method, the servo information may be less, but it has the restriction that the moving distance of the head between servo information sampling points must be within a range that the head can be unitarily identified, and hence the moving speed of the head is limited. In this case, if the repetition cycle of the servo pattern 31 is lengthened by adding position information bit having long cycle like P, Q and R of FIG. 14, the head position detecting ability is improved, and the head can be moved at faster speed, but since the maximum merit of this method i which the servo information amount may be less is lost, it has a limit. According to the above-described method, when the ranges where the head position can be unitarily identified from the servo pattern 31 are the same, the less the number of the sectors is, the more the allowable maximum moving speed is decelerated. Generally, since the number of sectors is determined by considering the other specifications such as data format, track follow-up performance, etc., the position and speed detecting ability, i.e., seeking performance depends upon the specifications, and it cannot be designed independent of them.

On the other hand, according to the absolute position detecting method, since it required the servo pattern having a number of bits such as Gray code, etc., the servo information amount is very increased as compared with the relative position detecting method. Therefore, it has a malfunction that data format efficiency is extremely wrong.

As described above, the sector servo system used to position the head in the disk apparatus such as the flexible magnetic disk apparatus (i.e., FD) lowers its data format efficiency if the number of servo sectors is increased so as to increase its servo band, and it is difficult to obtain sufficient storage capacity.

In the conventional sector servo type magnetic disk apparatus, for example, the following characteristics are provided:

(Characteristic 1): The position error signal of the magnetic head is not obtained between a sector and a sector.

(Characteristic 2): The number of servo sectors is limited in format efficiency.

(Characteristic 3): The open-loop gain of a servo system in a frequency band in which a disturbance exists is low.

The sector servo type magnetic disk apparatus is difficult by the above-described various characteristics to correctly follow u the magnetic head to a target p track against a disturbance such as an external vibration or impact, and has a problem that its responsivity at the time of offtracking due to a disturbance is deteriorated.

Further, the "relative position detecting method" for detecting the present position of the head from the position obtained by the previous sampling and the servo information obtained by the present sampling of the head position detecting methods used in the conventional disk apparatuses may use less servo information, but has a restriction that the moving distance of the head between servo information sampling points must be within the range in which the position of the head can be unitarily identified. Thus, in order to accurately detect the position and moving speed of the head, the moving speed of the head is limited. Therefore, it has a problem that a high speed seeking is difficult to be realized. If the repetition cycle of the servo pattern is lengthened in this method, the head position detecting capacity is improved and the high speed seeking is performed, but the servo information amount is increased to lose its maximum merit.

In the "absolute position detecting method" for forming the servo information to be unitarily identified from the servo information irrespective of the previous position information of the present position of the head, it is necessary to use a servo pattern having a number of bits such as Gray code. Therefore, the servo information amount is very increased, and there is a problem that the data format efficiency is deteriorated.

SUMMARY OF THE INVENTION

Accordingly, it is a primary object of the present invention to provide a disk system in which a wide servo band is obtained with less number of servo sectors to realize a high format efficiency.

Another object of the present invention is to provide a disk system in which a magnetic head can be accurately positioned correctly on a target track against a "disturbance" such as a vibration or an impact, etc.

Still another object of the present invention is to provide a disk system in which a high data format efficiency is realized with less servo information amount and less number of servo sectors to increase data storage capacity and to simultaneously accurately detect the position and moving speed of the head, thereby seeking at a high speed.

In order to achieve the above-described primary object of the invention, the disk system of the first aspect of the present invention comprises:

a first region (so-called "data zone") formed with a servo sector having servo information along a data track for recording and reproducing data on a disk; second regions (so-called "guard zones") having servo sectors having servo information along a servo track and of the number of magnification of integer number of the servo sectors in the first region, and a position sensor for detecting the position of a moving portion of a head moving mechanism to output a position signal.

(A) The head is positioned to a servo track when the disk system is started or non-accessed.

(B) The follow-up information of the head to the servo track is obtained by a position signal from the position sensor in this state.

(C) The head follow-up information is stored in a memory.

(D) When the head is positioned to a data track,
(1) immediately after the head is passed through the servo sector in the first region, a first track follow-up error information obtained from the servo information read from the servo sector is used, and
(2) while the head is passed between the servo sectors in the first region, the head is controlled to follow up the data track by using "second track follow-up error information" of a difference between head follow-up information to the data track obtained from the position signal from the position sensor and the follow-up information previously stored in the memory.

In order to solve the problem of the above-described conventional head position detecting method, there is provided according to the second aspect of the present invention a disk system comprising a disk on which a servo sector formed with a servo pattern for unitarily determining the head position of a seeking direction within a predetermined range and obtaining a position signal to control to follow up a data track is provided, head moving distance detecting means for obtaining a head moving distance per time equal to the detecting cycle of the servo sector by a worst error of the distance equal to said predetermined range or less, position calculating means for presuming the position of the head to a data track when next servo sector is detected from the position of the head to the data track obtained when each servo sector is detected and a head moving distance obtained by the head moving distance detecting means, and calculating the position of the head from the presumed position of the head and head position information obtained from the servo pattern in next servo sector, and seeking means for seeking a target track by a speed control by using the position of the head to the data track obtained at each servo sector, and the moving speed of the head obtained from the position of the head.

The head moving distance detecting means is means for detecting the position of the head from the exception of servo information formed on a disk surface, such as a position sensor for detecting the position of the head from a portion moving together with the head at the head itself or a movable portion connected rigidly to the head, and means for detecting the moving distance of the head per time equal to the detecting cycle of the servo sector from the output of the position sensor.

In order to solve the above-described another object of the present invention, there is provided according to the third aspect of the invention a disk system comprising:

(1) position detecting means for detecting the "position of a head" in the radial direction of a disk, (2) means for obtaining a differentiated output signal by differentiating twice or more the obtained position signal and suppressing a high frequency component of the differentiated output signal by filter means, and (3) means for obtaining a difference signal between an output signal of the filter means and a basic control signal obtained by calculating the position error signal obtained from servo information on the disk, and integrating means for integrating the difference signal to obtain a control signal for a head moving mechanism.

According to a preferred embodiment of the present invention, the disk system of the invention further comprises: control means which is effective by the following processing operations:

(1) setting, when the head is moved from the track on the disk to other track, the integrating operation of the integrating means for integrating the difference signal between the output signal of the filter means and the basic control signal to a stopping state at the time of accelerating the head moving mechanism to control under an open loop control at the highest speed, and (2) setting the integrating operation of the integrating means to the integrating state at the time of decelerating the head moving mechanism to control under a closed loop control for decelerating according to a desired speed.

According to first aspect of the present invention as described above, when the head is positioned on the data track, the first track follow-up error information is obtained immediately after the servo sector, and the difference between the follow-up information obtained from the position signal from the position sensor and the follow-up information previously stored in the memory at the time of starting the system or nonaccessing is obtained as the second track follow-up error information even between the servo sectors. Therefore, the head is positioned by the feedback servo by using the track follow-up error information to provide the positioning performance equivalent to the increase in the number of the servo sectors in the data zone. In other words, since the head positioning control system according to the present invention is equivalent to increase the sampling points in the sampled-data control system to enhance the sampling frequency, the "phase margin" in the open-loop transfer characteristic of the sampled-data servo system is increased, and wider servo band can be obtained. Further, the wide servo band is obtained without increasing the number of the servo sectors in the data zone, and the format efficiency is not sacrificed.

According to the second aspect of the present invention, the head moving distance detecting means for obtaining the head moving distance per time equal to the detecting cycle of the servo sector by the worst error of the distance or less equal to a predetermined range to be unitarily determined at the position of the head by the servo pattern is used to presume the position of the head to the data track at the next servo sector from the position of the head to the data track obtained at servo sector and the head moving distance, and the accurate position of the head to the data track is calculated from the presumed position of the head and the head position information obtained from the servo pattern in the next servo sector. In the detections of the position and the speed based on the position of the head, high detecting ability which does not depend upon the number of the servo sectors and the range in which the position of the head are unitarily identified is obtained.

Therefore, although the pattern including the information for following up the head to the data track as the servo pattern at the least and containing less servo information amount obtained only in the range of narrow region in which the position of the head can be unitarily identified is used, the position and the speed of the head can be accurately detected even when the head is moved at a high speed. Thus, an increase in the data storage capacity by the high data format efficiency and the high speed seeking can be carried out.

According to the third aspect of the present invention, when the position signal representing the position of the head in the radial direction of the disk is differentiated once, the "speed signal" corresponding to the moving acceleration of the head is obtained. When the speed signal is further differentiated, i.e., the position signal is differentiated twice, the "acceleration signal" corresponding to the movement of the head when a disturbance such as a vibration or an impact is applied to the head moving state is calculated. Therefore, the difference between the acceleration signal including the disturbance and the basic control signal obtained by calculating the position error signal obtained from the servo information is calculated, and the head moving mechanism is controlled by the signal integrated from the difference signal to rapidly suppress the head position error signal generated due to the disturbance, thereby improving the "track follow-up performance" and the "disturbance-proof performance". Further, even if the position signal is differentiated three times or more, the information of the acceleration due to the disturbance is stored. Therefore, the similar result is obtained by altering the position error signal based on the servo information together with the information of the acceleration.

When the position signal is differentiated twice o more, the noise component of the high frequency band included therein is intensified. Accordingly, the original control characteristic is deteriorated, but the high frequency band of the differentiated output signal is suppressed by the filter means thereby to obtain stable control characteristic without influence of the noise.

When the integrating operation of the integration unit is stopped during the open loop control period at the time of accelerating the head moving mechanism, the integration unit is saturated at the time of open loop control. Therefore, it is smoothly shifted to the closed loop control, thereby improving the follow-up performance of the desired speed of the head moving mechanism.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 7A and 7B are views showing a position signal obtained by deing a position information portion of a servo pattern of FIG. 6 and a position signal obtained from a position sensor;

FIG. 20 is a control block diagram of a head positioning control system of a magnetic disk system of the embodiment;

FIGS. 21A to 21C and 22A to 22C are views showing disturbance suppressing characteristics of prior art and the present invention;

FIGS. 33 and 34 show still another embodiment of FIG. 26, wherein FIG. 33 is a graph showing the output of the position sensor, and FIG. 34 is a plan view of a magnetic disk system illustrating the second mounting example of a linear scale and an optical sensor;

FIG. 35 is a plan view of a magnetic disk system showing second mounting example of a scale and an optical sensor;

FIG. 36 is a plan view showing the coil of a voice coil motor (in the second mounting example);

FIG. 37 is a sectional view of a voice coil motor in FIG. 20;

FIG. 38 is a plan view of a mask in the second mounting example);

FIG. 39 is a view showing the output of a photodetector (in the second mounting example);

FIG. 40 is a view showing the output of the photodetector according to modified embodiment of FIG. 36.

DETAILED DESCRIPTION OF THE PREFERRED EMBODIMENTS

Figure 1:
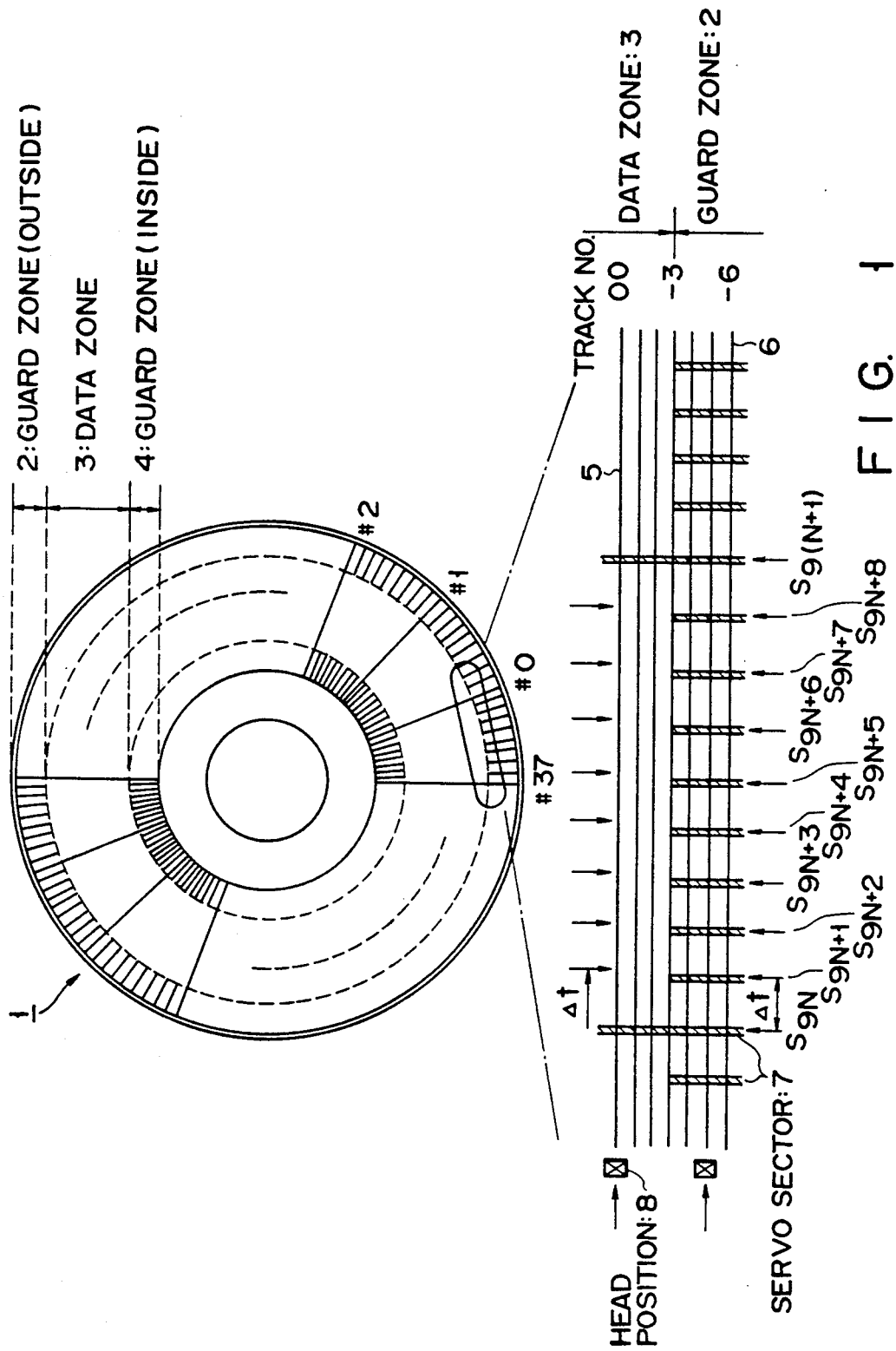
FIG. 1 is a view showing the disposition of a servo sector on a disk and a track radial runout detecting position of a guard zone according to an embodiment of the present invention.

FIG. 1 shows a disposition view of a servo sector provided on a disk recording medium according to an embodiment of the present invention and an enlarged view of a track fluctuation detecting position in a guard zone.

A number of servo sectors 7 ($S_{9N}$, etc.) are provided at an equal interval on data tracks 5 in a "data zone" 3 of a region for recording and reproducing data on a disk 1. Servo sectors 7 ($S_{9N}$, $S_{9N+8}$, etc.) are also provided at an equal interval on servo tracks 6 in "guard zones" 2 and 4 provided on regions on which no data is recorded, i.e., on the innermost side and the outermost side of the disk. However, as many servo sectors 7 as possible are provided in the guard zones 2 and 4. For example, the servo sectors 7 are formed in the number of magnification of integer number of the servo sectors 7 in the data zone 3. In this embodiment, 38 servo sectors 7 of the data zone 3 are provided, and the number of the servo sectors in the guard zones 2 and 4 are 342 of nine times as large as the number of the servo sectors 7. Servo patterns for obtaining the same position signals as those of the position signals obtained in the data zone 3 in the relationship of the position signals are formed in the servo sectors 7 of the guard zones 2 and 4.

Figure 2:
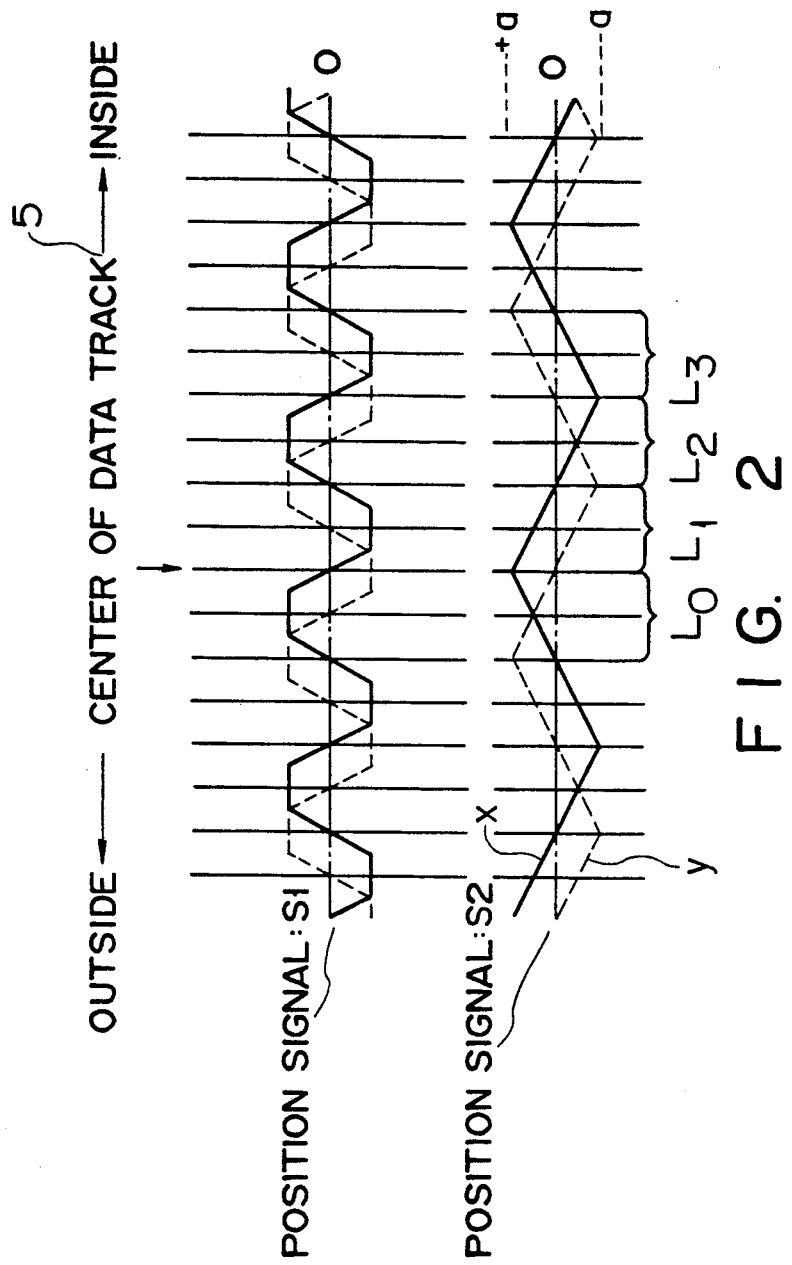
FIG. 2 is a view showing a position signal obtained by decoding a servo pattern formed on a servo sector and a position signal obtained from a position sensor for detecting the deviation amount of a head in the embodiment.

FIG. 2 is a view showing a position signal S1 obtained by reading and decoding the servo pattern formed on the servo sector 7 on the disk 1, and a position signal S2 obtained from a position sensor mounted at the moving portion of the moving mechanism for moving a head 8 in the radial direction of the disk. Both the position signals S1 and S2 are varied when the head 8 is moved in the radial direction of the disk 1.

The position signal S1 obtained from the servo pattern is a perspective signal obtained from only each servo sector to give the position information of the head 8 to the tracks on the disk 1. On the other hand, the position signal S2 obtained from the position sensor is continuous signals to given the position of the head 8 to a drive base. The position in which the position signal S1 becomes "1" is the center of the data track, and the head 8 is controlled to be positioned by a feedback servo system so that the position signal S1 becomes "0".

When a "track radial runout" occurs and the head 8 follows up the track radial runout, track follow-up information is obtained from the position signal S2 from the position sensor. Therefore, even if the head 8 follows up the worst track radial runout on each data track, the position signal obtained from the position sensor must be linear with respect to the variation in the head position in a range for moving the head 8 so as to obtain the track follow-up information having no distortion. In this embodiment, the worst track radial runout is set to 0.5 track or less, and the position signal S2 as shown in FIG. 2 is obtained from the position sensor. The signal of 2-phase signals indicated by a solid line and a broken line as position signals S2 for obtaining a linear signal is selectively used on each track.

When a disk is inserted into the disk system, the head 8 is positioned on arbitrary tracks of the guard zones 2 and 4. A number of the servo sectors 7 in the guard zones 2 and 4 are formed at a smaller interval than that of the servo sectors 7 in the data zone 3. Thus, signals near continuous signals are obtained as the position signal S1. Therefore, the position signal S1 is used for a servo to obtain a wide servo band. As a result, an excellent track "follow-up control" is carried out. At this time, track follow-up information substantially following up the "track radial runout" is obtained from the position signal obtained by the position sensor.

When the head 8 is passed over the servo sector $S_{9N}$ (N: 0 to 37) in the guard zones 2 and 4 and the servo sectors $S_{9N+1}$ to $S_{9N+8}$ provided at an equal interval between the servo sectors $S_{9N}$, the positions $P_{9N}$, $P_{9N+1}$ to $P_{9N+8}$ of the head 8 are calculated as follows from the position signals S2 obtained by the position sensor. Zones L0, L1, L2, and L3 in which the head is present can be obtained from a pair of X and Y signals constituting a potential signal S2 by judging if they satisfy the following conditions:

L0: $X \geq 0$, $Y > 0$

L1: $X > 0$, $Y \leq 0$

L2: $X \leq 0$, $Y < 0$

L3: $X < 0$, $Y \geq 0$.

Further, the position P of the head can be obtained when only X signal is known from the following equations:

In the case of L0, $P = 2X/a + T0$
In the case of L1, $P = 2(1 - X/a) + 2 + T0$
In the case of L2, $P = -2X/a + 4 + Tp$
In the case of L3, $P = 2(1 + X/a) + 6 + T0$, where $\pm$ is the maximum amplitude of X and Y signals, and T0 is a distance from a reference track to the start track of the zone L0. The position P of the head can be obtained from only Y signal, or from both X and Y signals.

Further, differences between the position $P_{9N}$ and the positions $P_{9N+1}$ to $P_{9N+8}$, i.e., the head 8 follow-up information $D_{9N+1}$ to $D_{9N+8}$ ($D_{9N+n} = P_{9N+n} - P_{9N}$ (n: 1 to 8) of the head 8 to the data track 5 are calculated, and the calculated values are stored in a memory corresponding to the sector numbers N and n. It is noted that this embodiment may be modified such that the follow-up information $D_{9N+1}$-$D_{9N+8}$ are obtained by calculating plural times over a plurality of revolutions of the disk and the average value of them is calculated to obtain more accurate follow-up information.

In this embodiment, it is assumed that the number of detections of the track follow-up information is equal to the number of the servo sectors buried in the guard zone. This is because the timing for detecting the information is obtained from the servo sectors. It is noted that the number of detections of the track follow-up information is better in the case of more in number in the range to be processed.

Generally, a "secondary mode track radial runout" occurs in a flexible magnetic disk due to anisotropic elongation and contraction of the disk in the case of changes in temperature and moisture. The components of the track raidal runout are slightly different at the inside and outside of the disk. However, since the data are obtained as components in the sectors, the difference of the track radial runout at the inside and the outside of the track become small, the more the number of the data per one cycle is. Therefore, in this case, the differences does not substantially become a problem. In order to further raise the accuracy, the data obtained on the guard zone 2 of the outermost side of the track may be used on the data track of the half of the outside of the disk, and the data obtained on the guard zone 4 of the innermost side of the track may be used on the data track of the half of the inside of the disk. Or, the average value of the data obtained on the guard zones of the outermost and innermost sides is calculated and may be used. A secondary mode track radial runout does not substantially occur on a hard disk.

Generally, the track radial runout is varied in the case of change in time. Therefore, when the data track is not accessed, the data are acquired, and suitably updated.

Then, when the head 8 is positioned on the data track 5 of the data zone 3, immediately after the head 8 is passed over the servo sector $S_{9N}$ in the data zone 3, first track follow-up error information $E_{9N}$ is generated from the position information obtained by reading a servo pattern from the servo sector $S_{9N}$, and the information is used as a head positioning control signal in a feedback servo loop system. At this time, the head position $P'_{9N}$ is obtained by the position signal from the position sensor at the same time. Further, when the head 8 is passed over between the servo sectors in the data zone 3 such as, for example, between the $S_{9N}$ and the $S_{9N+1}$, i.e., the positions corresponding to the servo sectors $S_{9N+1}$ to $S_{9N+8}$ of the guard zones 2 and 4, the head positions $P'_{9N+1}$ to $P'_{9N+8}$ are obtained by the position signals from the position sensor, differences between the $P'_{9N+1}$ to $P'_{9N+8}$ and the head position $P'_{9N}$ obtained by the position signal from the position sensor immediately after the head 8 is passed over the servo sector $S_{9N}$ as described above, i.e., the follow-up information $D'_{9N+8}$ to $D'_{9N+8}$ ($D'_{9N+n}$ (N: 0 to 37, n: 1 to 8) of the head 8 to the data track 5 are obtained. For example, if the head 8 accurately follows up the data track 5, the follow-up information $D'_{9N+n}$ is equal to the follow-up information $D_{9N+n}$ previously stored in the memory. In other words, the following formula is satisfied:

$$D_{9N+n} = D'_{9N+n}$$

More specifically, the above formula is obtained as second track follow-up error information. When the head 8 is passed over between the servo sectors in the data zone 3, i.e., the positions corresponding to the servo sectors $S_{9N+1}$ to $S_{9N+8}$ in the guard zones 2 and 4, the above-described second track follow-up error information $E'_{9N+n}$ is used as a head positioning control signal in the feedback servo loop system. In this case, when time required to pass the head 8 over between the servo sectors $S_{9N+1}$ to $S_{9N+8}$ in the guard zones 2 and 4 is $\Delta t$, the timing for detecting the positions of the servo sectors $S_{9N+1}$ to $S_{9N+8}$ in the guard zones 2 and 4 by the head 8 may be obtained by sequentially adding the $\Delta t$ from the timing for detecting the position of the servo sector $S_{9N}$.

The first track follow-up error information $E_{9N}$ and the second track follow-up error information $E'_{9N+n}$ in the feedback servo loop system are gain-controlled so that the position/voltage conversion gains become the same values.

Figure 3:
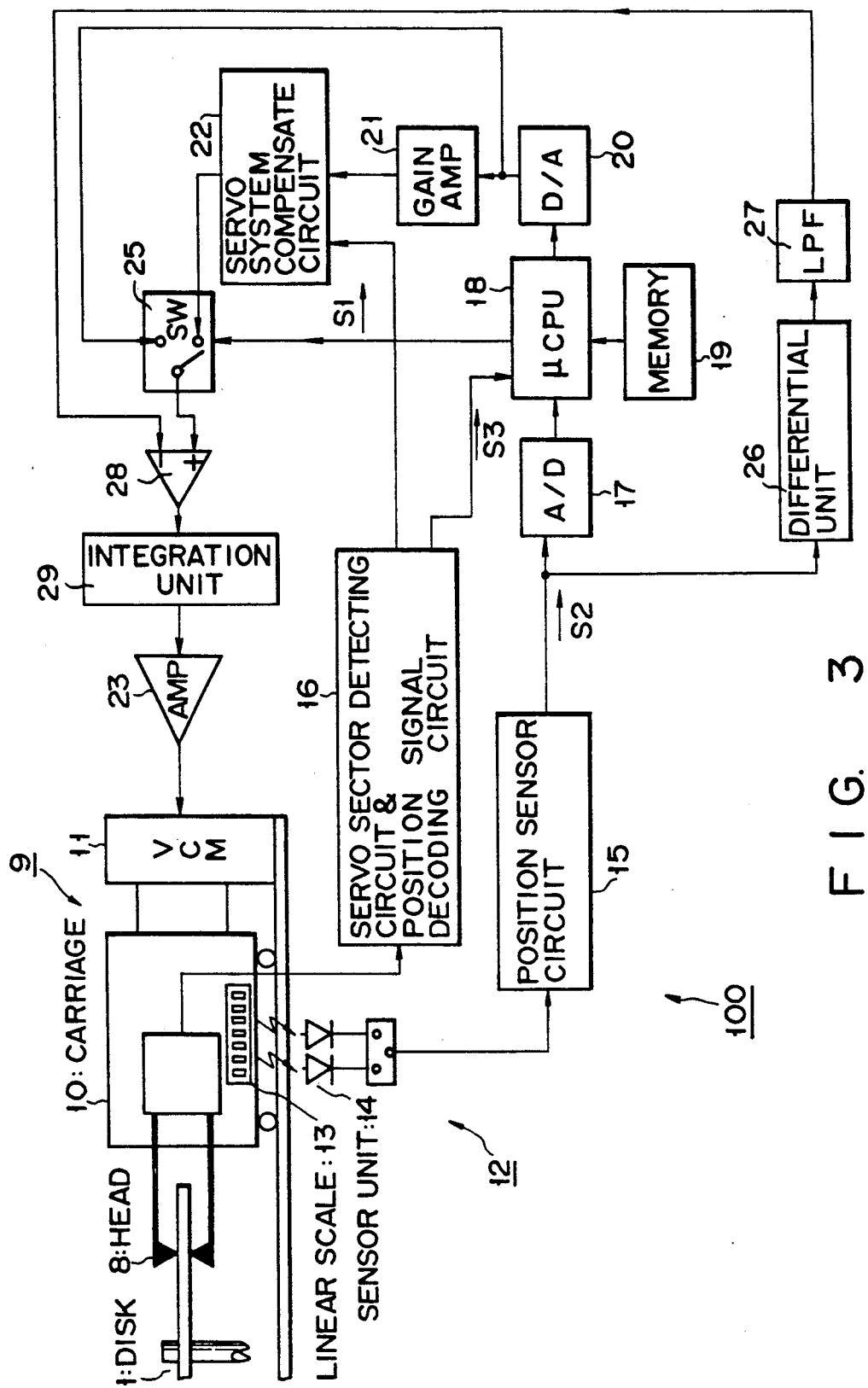
FIG. 3 is a block diagram showing the structure of a head positioning servo system of a disk system according to the embodiment.
Figure 4:
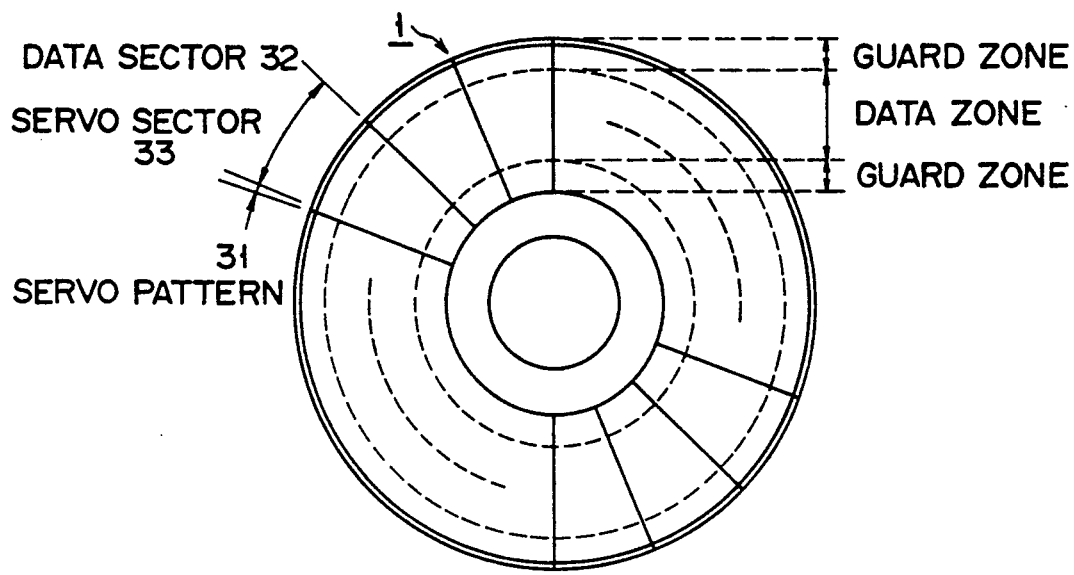
FIG. 4 is a view showing disposition of a servo sector on a disk according to prior art.
Figure 5:
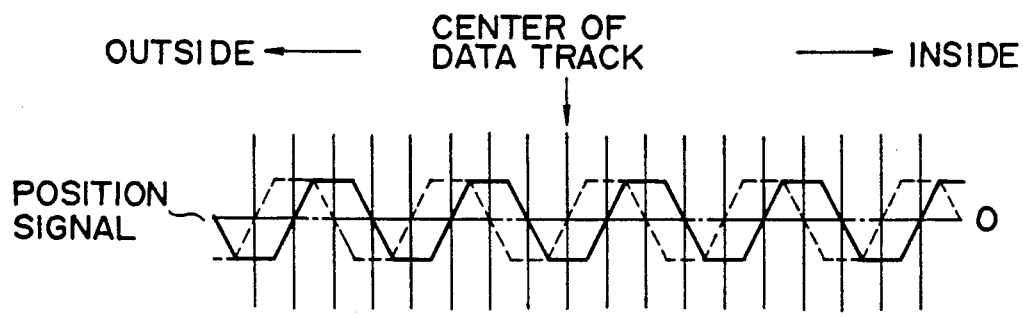
FIG. 5 is a waveform diagram of a position signal obtained by decoding a servo pattern in prior art.

FIG. 3 shows the structure of a head positioning servo system of a disk system according to this embodiment based on the above-described operating principle.

In FIG. 3, a head 8 is moved in the radial direction of a disk 1 by a head moving mechanism 9. The head moving mechanism 9 comprises a carriage 10 for placing the head 8, and a voice coil motor 11 for moving the carriage 10 in the radial direction of the disk 1. A position sensor 12 for detecting the position of the carriage 10 of a moving portion of the head moving mechanism 9 includes a linear scale 13 in which slits of an opened window for transmitting a light are formed by etching, two sets of optical sensor units 14 (i.e., one unit has a combination of a light emitting element and a light receiving element or a photodetector), and a positioning sensor circuit 15. The interval of the slits of the linear scale 13 and the disposition of the two sets of the optical sensor units 14 are determined so as to obtain a position signal S2 (FIG. 2) from the positioning sensor circuit 15.

A servo sector detecting and position signal decoding circuit 16 decodes a dispersive position signal S1 indicating the position of the head 8 to the data track 5 on the disk 5 from a reproduced output of the head 8, and a servo sector detection signal S3, and outputs them. The position signal S1 is fed back as a control signal to a current amplifier 23 for driving a voice coil motor (VCM) 11 through a servo system compensating circuit 22 including, for example, a phase lead/lag compensating circuit, a low pass filter, etc. The electric constant of the servo system compensating circuit 22 is designed in response to the case of positioning the head 8 in the guard zones 2 and 4 having a number of servo sectors.

On the other hand, the position signal S2 from the positioning sensor circuit 15 is input to a $\mu$CPU 18 through an A/D converter 17. The displacement amount of the head 8, i.e., follow-up information of the head 8 to the track is calculated by the calculating capacity.

When the follow-up information $D_{9N+1}$ to $D_{9N+8}$ as the positioning reference of the head 8 to the servo track 7 in the guard zones 2 and 4 are obtained, the position signals S2 from the positioning sensor circuit 15 are input to the $\mu$CPU 18 through the A/D converter 7 in synchronization with the respective servo sector detection signals S3, the $D_{9N+1}$ to $D_{9N+8}$ are calculated as described above, and obtained. Then, the values are stored in a memory 19.

When the head 8 is positioned on the data track 5 in the data zone 3, the servo sector is first detected, a timer is operated in synchronization with the detection signal S3, and the $P'_{9N}$ is obtained by the position signal S2 from the positioning sensor circuit 15. Subsequently, the time point when $\Delta t$ is elapsed is detected by a timer, the position signal S2 is input from the positioning sensor circuit 15 at that time, the $D'_{9N+1}$ is obtained, the $D_{9N+1}$ is output from the memory 19, the second track follow-up error information $E'_{9N+1}$ is obtained, and output through a D/A converter 20. The output signal of the D/A converter 20 is gain-controlled by a gain amplifier 21 as described above, and then supplied as a control signal to the servo system compensating circuit 22.

According to the embodiment of the present invention as described above of the processing sequence, the following effects are obtained. When the head is positioned on the data track, the first track follow-up error information is obtained immediately after the servo sector, and the difference between the follow-up information obtained from the position signal of the position sensor and the follow-up information previously stored in the memory is obtained even between the servo sectors as the second track follow-up error information.

Therefore, since the number of the sampling points are increased by positioning the head by the feedback servo on the basis of these track follow-up error information, the same effect that the sampling frequency is raised is obtained. Thus, since the phase margin in the open-loop transfer characteristic of the sampled-data servo system is increased, a wider servo band can be obtained. In this manner, an accurate follow-up corresponding to the track radial runout in the servo band such as primary and secondary mode track radial runout is not only performed, but also stiffness against a disturbance such as a vibration, an impact, etc., is further strengthened. Further its settling time can be shortened. As a result, the head positioning capacity can be largely improved.

In addition, in the disk system of this embodiment of the present invention, the number of the sectors are not increased at all as compared with prior art. Since the disk system in which the number of the sectors is decreased can provide the head positioning performance equivalent to that of the prior art, its format efficiency is improved. As a result, it can contribute to an increase in the storage capacity of the disk system.

Figure 6:
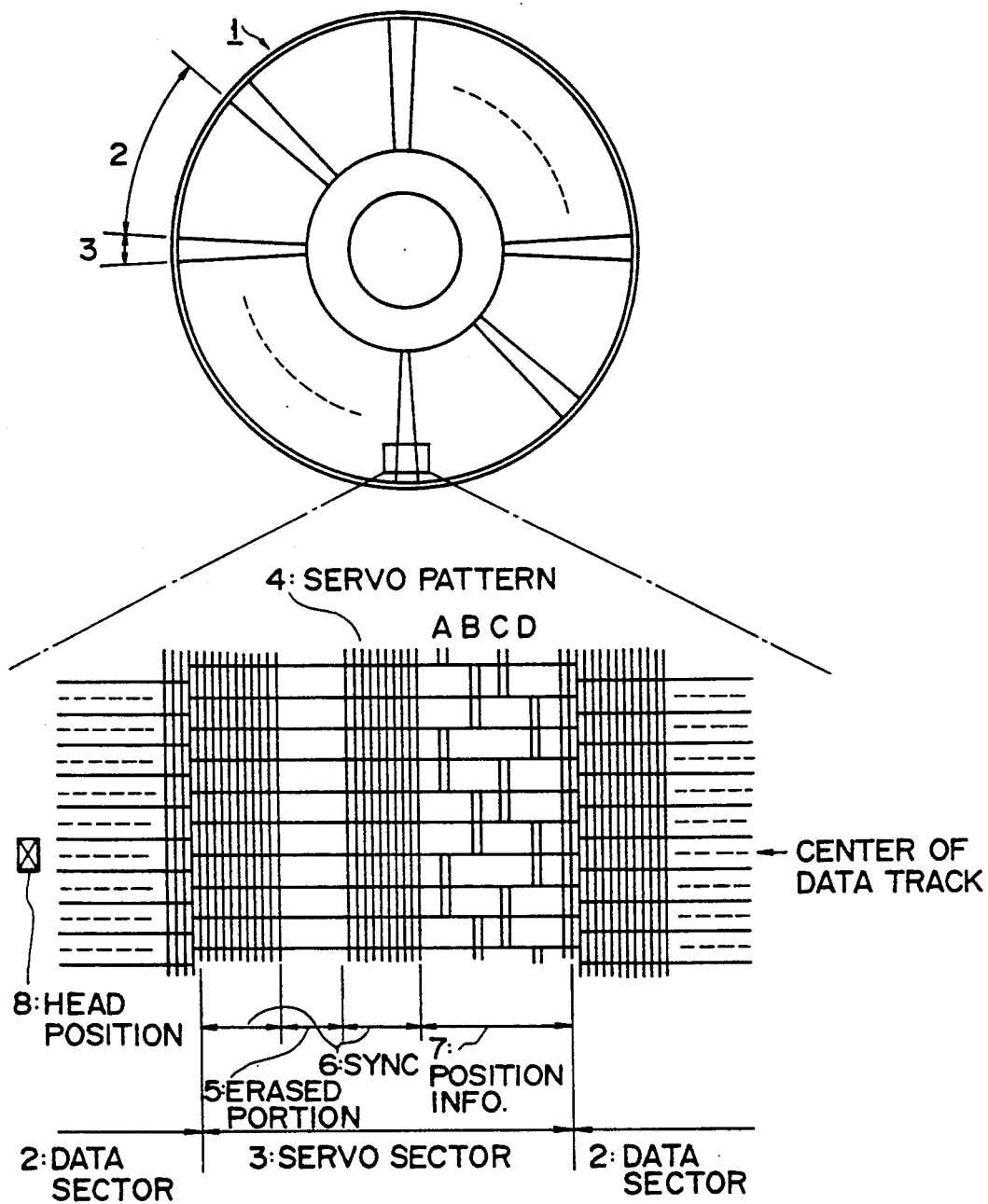
FIG. 6 is a view showing a servo pattern formed on a disk and the structure in one embodiment of the present invention.

FIG. 6 is a view showing a servo pattern 4 formed on a disk 1 according to another embodiment of the present invention. As shown in FIG. 6, a servo pattern 4 for obtaining 2-phase position signals to be repeated in a cycle of four tracks is formed on a partial servo sector region 3 of a sector on the data surface of a disk 1.

The servo pattern 4 has an erased portion which is not inverted in magnetization, synchronization information portions (SYNC portions) 6 provided at the front and rear portions of the erased portion 5, and a position information portion 7. The servo sector 3 is detected by detecting the erased portion 5, the timing synchronized with the SYNC portions 6 continued to the servo sector 3 is provided, and signals are reproduced by the head 8 for recording and reproducing data from patterns A, B, C and D of the position information portion 7.

Position signals X=SA−SB, Y=SC−SD are decoded from the amplitude values SA, SB, SC and SC of the reproduced signals from the patterns A, B, C and D. FIG. 7A shows waveforms of the position signals X and Y obtained when the head 8 is moved in the radial direction of the disk 1. The position signals X and Y are actually dispersive signals which are detected only each time when the head 8 is passed over the servo sector 3 in accordance with the revolution of the disk 1.

Figure 8A:
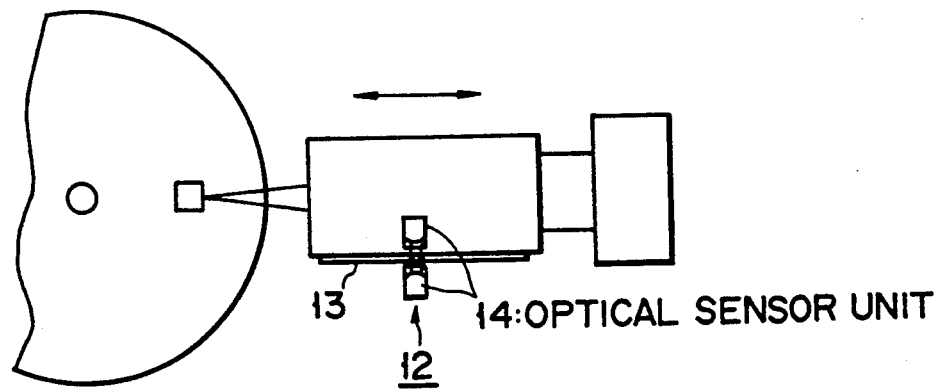
FIGS. 8A and 8B are views showing structure of the position sensor for applying signals of continued positions of the head in the embodiment.
Figure 8B:
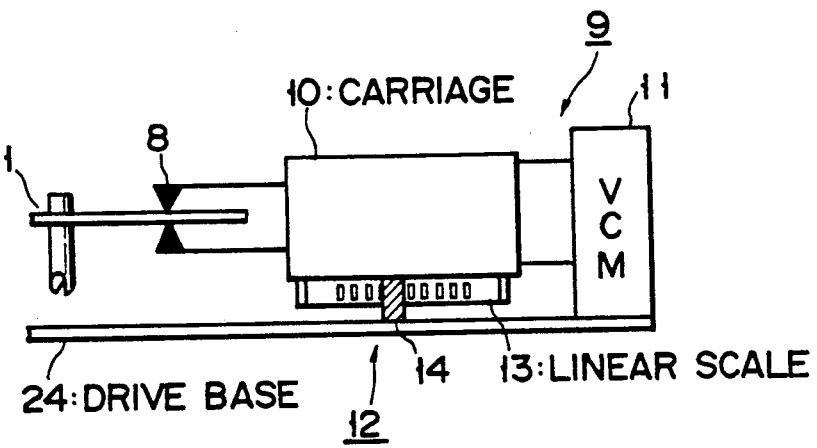

On the other hand, as shown in FIGS. 8A and 8B, as a head moving mechanism 9 for moving the head 8 in the radial direction of the disk 1 on a drive base 24, a carriage 10 for placing the head 8 and a voice coil motor (VCM) 11 for moving the carriage 10 are provided. Further, in order to detect the position of the head 8 from exception of servo information formed on the surface of the disk 1, a position sensor 12 for detecting the position of the carriage 10 of the moving portion of the head moving mechanism 9 is provided. This position sensor 12 is mounted on the carriage 10. The position sensor 12 has a linear scale 13 mounted on the carrier 10 and in which slits of an opened window for transmitting a light are formed by etching, two sets of optical sensor units 14 (i.e., one unit has a combination of a light emitting element and a light receiving element or a photodetector) disposed to hold the linear scale 14, and a positioning sensor circuit 15 (FIG. 10) to be described later.

Continuous position signals LX and LY obtained from the position sensor 12 are shown in FIG. 7B. These position signals LX and LY have the same cycles of the position signals X and Y obtained by decoding the reproduced signal from the position information portion 7 of the servo pattern 4 and continuously obtained signals to be detected always.

FIGS. 7A and 7B show the positional relationship between the position signals X, Y from the position information portion 7 of the servo pattern 4 and the position signals LX, LY from the position sensor 12. In this example, the track to be determined by the position signals X and Y coincides with the track to be determined by the position signals LX and LY. However, they are actually slightly deviated, and it is difficult to accurately determined the position of the head 8 to the data track on the surface of the disk 1 by using only the position signals LX and LY. Therefore, the position signals LX and LY are used to roughly position the head 8 to the data track on the surface of the disk 1, and the accurate position of the head 8 to the data track is obtained by using the position signals X and Y.

A method of obtaining the position of the head 8 from the position signals LX and LY obtained from the servo pattern 4 on the disk 1 will be first described. It is now assumed that the head 8 is actually disposed in a zone La and the zone in which the head 8 obtained by sampling a certain servo sector (which is called as S=n-th sampling) exists and the position in the zone are La and Da (a: 0 to 3) The zones L0 to L3 in which the head 8 exists and the positions D0 to D3 in the zones L0 to L3 are detected as described in the above paragraph of the "Description of the Prior Art". In other words, the zones L0, L1, L2 and L3 where the head 8 exists are obtained by determining the amplitudes of the position signals X and Y as below.

$X \geq 0, Y > 0 \rightarrow L0$ $X > 0, Y \leq 0 \rightarrow L1$ $X \leq 0, Y < 0 \rightarrow L2$ $X < 0, Y \geq 0 \rightarrow L3$ Then, the positions D0, D1, D2 and D3 in the zones ($0 < D < 1$) are obtained by using second position signal groups $U = X + Y$, $V = X - Y$ formed from the position signals X and Y as below.

$D0 = V/(2a) + 0.5$ $D1 = 0.5 - U/(2a)$ $D2 = 0.5 - V/(2a)$ $D3 = U/(2a) + 0.5$ where $\pm a$ is the amplitude value of the signals X and Y shown in FIG. 7A. It is assumed that the position of the head 8 at this time is $P_{S=n}$.

If a restriction that the head 8 is moved only within three zones (in the case of La=L0, within L0 to L3) of the inside including between the La until next sampling (S=n+1) is provided, the position of the head 8 can be determined as below from the zones where the head 8 exists and the positions within the zones at the sampling of S=n+1.

In the case of the La:

$$P_{S=n+1} = \text{int}(P_{S=n}) + Da$$

In the case of the L(a+1) mod4:

$$P_{S=n+1} = \text{int}(P_{S=n}) + 1 + D(a+1)\text{mod}4$$

In the case of the L(a+2)mod4:

$$P_{S=n+1} = \text{int}(P_{S=n}) + 2 + D(a+2)\text{mod}4$$

In the case of the L(a+3)mod4:

$$P_{S=n+1} = \text{int}(P_{S=n}) + 3 + D(a+3)\text{mod}4$$

where the int ( ) means the omission of fraction, and the mod is an operator for obtaining a remainder. The track number is set to be increased larger toward the track of the inside. For example, if the zone La=L0 in the S=m and the int $(P_{S=n})$=B are set, $P_{S=n+1}$ is obtained as below.

In the case of the zone L0 with S=n+1:

$$P_{S=n+1} = 8 + D0$$

In the case of the zone L1 with S=n+1:

$$P_{S=n+1} = 9 + D1$$

In the case of the zone L2 with S=n+1:

$$P_{S=n+1} = 10 + D2$$

In the case of the zone L3 with S=n+1:

$$P_{S=n+1} = 11 + D3$$

As described above, the position can be detected without error only when the restriction in the movement of the head 8 that, "when the head 8 is disposed in the zone Ln (n: 0 to 3) at a certain sampling S=n, a range in which the head 8 exists at the next sampling S=n+1 falls within the four front and rear zones including the Ln" is provided. More specifically, when the position of the head 8 is obtained only from the position signal obtained from the servo pattern of one track cycle, the distance of moving the head 8 between the samplings is limited to the range without the above-described four tracks.

However, when the distance for moving the head 8 between the samplings is obtained in rough accuracy of the degree of ±1 track of the maximum error irrespective of the moving speed, the position of the head 8 to the data track can be accurately obtained. It is assumed that the position of the head 8 obtained from the continuous position signals LX and LY obtained from the position sensor 12 satisfies the accuracy.

A sequence of obtaining the accurate position of the head 8 to the data track will be described by referring to FIG. 9.

<1> It is assumed that the zone La in which the head 8 exists, the position Da (a: 0 to 3) in the zone, and the position $P_{S=n}$ of the head 8 to the data track are obtained by detecting (sampling) of S=n-th servo sector. At this time, the position $P_k$ of the head 8 is obtained from the continuous positions LX and LY from the position sensor 12 at the same time, where the dimension of the head position $P_k$ is the same as that of the $P_{S=n}$ (in which the distance corresponding to one track pitch is set to "1"), but the values are not always coincident.

<2> Then, it is assumed that the zone Lb in which the head 8 exists and the position Db (b: 0 to 3) in the zone are obtained by detecting of S=(n+1)-th servo sector. At this time, the position $P_{k+m}$ of the head 8 is obtained from the continuous positions LX and LY from the position sensor 12 at the same time. Thus, the distance for moving the head 8 between the sampling points is obtained by $(P_{k+m} - P_k)$. However, this value does not accurately coincide with the moving distance of the head 8 obtained from the servo pattern. The worst error is ±1 track pitch or less. Therefore, the position of the head 8 to the data track at the time of S=(N+1)-th sampling is approximately obtained as below.

$$P'_{S=n+1} = P_{S=n} + (P_{K+m} - P_k)$$

This $P'_{S=n+1}$ is a presumed value of the head position to the data track at the time of detecting the S=(n+1) th servo sector.

<3> The position P of the head 8 obtained from the position signal decoded from the servo pattern 4 is corresponded to the zone in which the head 8 exists as below.

In the case of int (P) mod4=0 : L0
In the case of int (P) mod4=1 : L1
In the case of int (P) mod4=2 : L2
In the case of int (P) mod4=3 : L3 where the int ( ) means omission of fraction of the head position P.

The zone is presumed from the $P'_{S=n+1}$ by using these functions. Since the zone obtained from the position $P'_{S=n+1}$ is proved in the accuracy that the maximum error falls within ±1 track or less, the position of the head 8 is always disposed within the range of the zones to L(b−1)mod4 to Lb−L(b+1)mod4 in term of the zone Lb in which the head 8 exists.

<4> As the condition in which the position of the head 8 is determined by using the position signals X and Y to be decoded from the servo pattern 4, the restriction in which, it is assumed that the head 8 exists in the zone Lj (J: 0 to 3) at the time of detecting a certain head position, the range in which the head 8 exists at the time of detecting its next head position falls only in the two zones of the inside including the zone Lj and the two zones of the outside from the from the zone Lj" is provided. For example, the head position can be always determined by providing the condition in which, if the head 8 exists in the zone L0 at the time of detecting a certain head position, the head 8 always exists in the two zones L0 to L1 of the inside including the zone L0 and the two zones L3 to L2 of the outside from the zone L0.

<5> Then, the accurate position $P_{S=n+1}$ of the head 8 to the data track at the time of detecting the S=(n+1)-th servo sector is obtained from the presumed position $P'_{S=n+1}$ of the head position obtained in the above paragraph <2> as below. The accurate head position $P_{S=n+1}$ is obtained by assuming that the head 8 exists at the $P'_{S=n+1}$ at the time of sampling before the S=(n+1)-th sampling. The zone in which the head 8 exists obtained by detecting the S=(n+1)-th servo sector and the position in the zone are respectively Lb and Db (b: 0 to 3), and the zone to be presumed from the $P'_{S=n+1}$ is any of $L(b-1)\bmod 4$ to $Lb$ to $L(b+1)\bmod 4$.

Then, the accurate position $P_{S=n+1}$ of the head 8 to the data track on the surface of the disk 1 is obtained as below in the cases of the $L(b-1)\bmod 4$, $Lb$ and $L(b+1)\bmod 4$.

In the case of $L(b-1)\bmod 4$:

$$P_{S=n+1} = \text{int } (P'_{S=n+1}) - 1 + D(b-1)\bmod 4$$

In the case of $Lb$:

$$P_{S=n+1} = \text{int } (P'_{S=n+1}) + Db$$

In the case of $L(b+1)\bmod 4$:

$$P_{S=n+1} = \text{int } (P'_{S=n+1}) + 1 + D(b+1)\bmod 4$$

Figure 15:
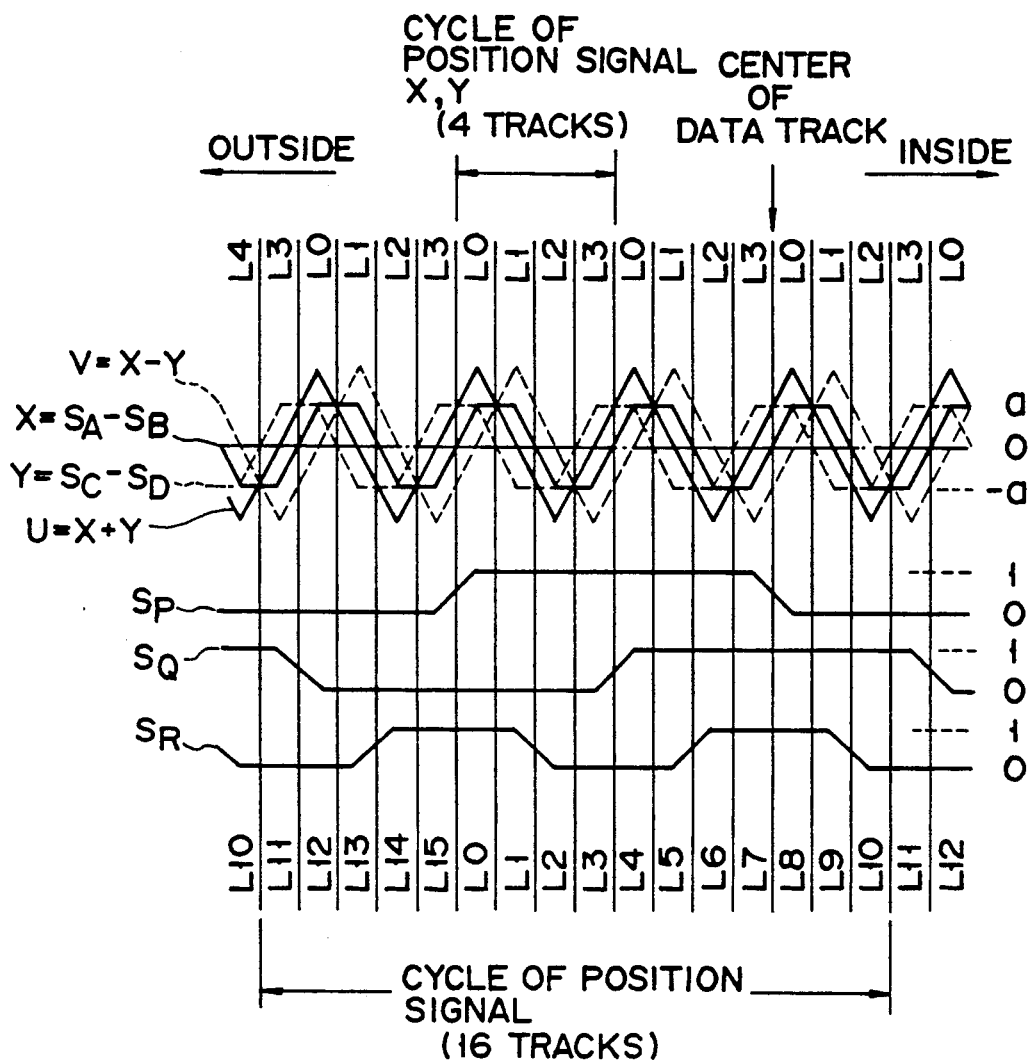
FIG. 15 is a view showing a position signal obtained by decoding a servo pattern according to prior art.

In the above-described embodiment, the detecting accuracy of the head position obtained from the continuous position signals LX and LY obtained from the position sensor 12 is set to ±1 track or less. This is because the servo pattern 4 in which the range for unitarily determining the position of the head 8 from the servo pattern 4 is less than 4 tracks is employed. For example, if information bits shown in FIG. 15 of the prior art are added to the servo pattern 4 of FIG. 6, the cycle of the position signal is set to 8 tracks, i.e., the track zone is set to L0 to L7, the range for unitarily identifying the position of the head 8 is extended, it is allowed even if the detecting accuracy of the head position obtained from the continuous position signals LX and LY is worse than ±1 track.

Then, a method of obtaining the position of the head 8 from the position signals LX and LY obtained from the position sensor 12 will be described.

The position signals LX and LY are also used by sampling as the position signals X and Y obtained from the servo pattern 4 are sampled in the servo sector 3. Since the position signals LX and LY are continuous, the sampling cycle may be arbitrarily set. The sampling cycle determines the position detecting ability, and is determined from the maximum moving speed of the head 8. Here, it is assumed that the sampling cycle of the position signals LX and LY is larger than the cycle of the servo sectors. Since the position obtained from the position signals LX and LY at the time of sampling in S=n-th servo sector is $P_k$ and the position obtained from the position signals LX and LY at the time of sampling in S=(n+1)-th servo sector is $P_{K+m}$, the position signals LX and LY are sampled (m−1) times (m>1) during this period and the position of the head 8 is detected.

Therefore, this method can be fundamentally performed by the same method as the method of obtaining the position of the head 8 from the positions X and Y obtained from the servo pattern 4 on the disk 1. That is, the zones L0, L1, L2 and L3 in which the head 8 exists are obtained as below by determining the magnitudes of the position signals LX and LY.

$LX \leq 0, LY > 0 \rightarrow LL0$ $LX > 0, LY \leq 0 \rightarrow LL1$ $LX \leq 0, LY < 0 \rightarrow LL2$ $LX < 0, LY \geq 0 \rightarrow LL3$ Further, the positions LD0, LD1, LD2 and LD3 (0 ≤ LD < 1) in the zones LL0, LL1, LL2 and LL3 are obtained as follows (A) or (B) from the LX or LY.

$$\begin{aligned} LL0{:}D0 &= LX/b \\ LL1{:}D1 &= 1 - LX/b \\ LL2{:}D2 &= -LX/b \\ LL3{:}D3 &= 1 + LX/b \end{aligned} \quad (A)$$

$$\begin{aligned} LL0{:}D0 &= 1 - LY/b \\ LL1{:}D1 &= -LY/b \\ LL2{:}D2 &= 1 + LY/b \\ LL3{:}D3 &= LY/b \end{aligned} \quad (B)$$

where ±b is the amplitude values of the position signals LX and LY.

According to the head position detecting method, as described with respect to the prior art, the position of the head 8 can be detected without error when the restriction in which the head 8 is moved only within the four tracks including the zone in which the head exists at present between the sampling points is provided.

Figure 9:
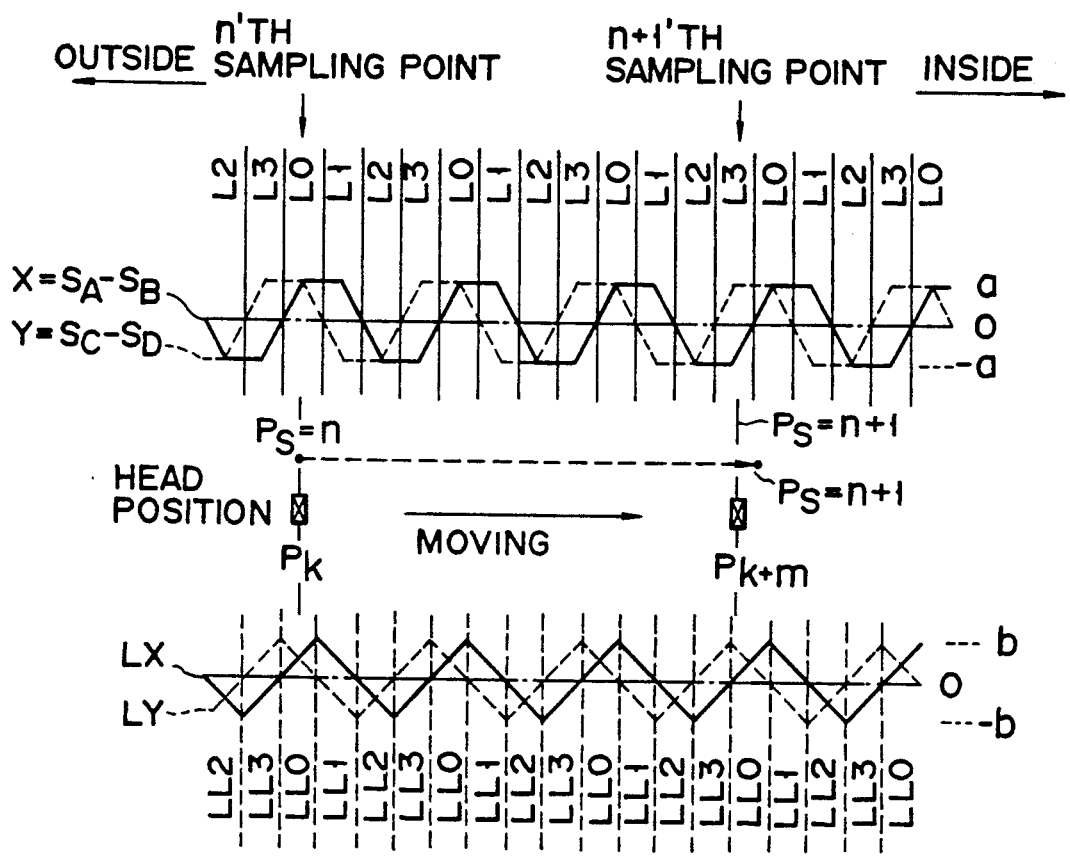
FIG. 9 is a view for explaining how to obtain an accurate head position to a data track.

In, for example, FIG. 9, the head 8 is moved to the inside, but the head 8 might be moved back at one track to the outside in the worst case. In this case, the restriction in which, if the head 8 exists in the zone L0 by a certain sampling, the range in which the head 8 can be moved to next sampling time falls within the zone L3 of the outside of the L0 and the zones L0 to L2 of the inside including the L0 is provided. In this case, the distance for moving the head 8 between the continuous sampling points, i.e., the allowable maximum moving speed is limited to less than 2 track pitch per time equal to the detecting cycle of the servo sector. However, since the position signals LX and LY are continuous as described above, the sampling cycle may be arbitrarily set. The sampling cycle determines the position detecting ability, and is determined to the value for positively detecting the position of the head 8 even if the head 8 is moved at the maximum speed.

Figure 10:
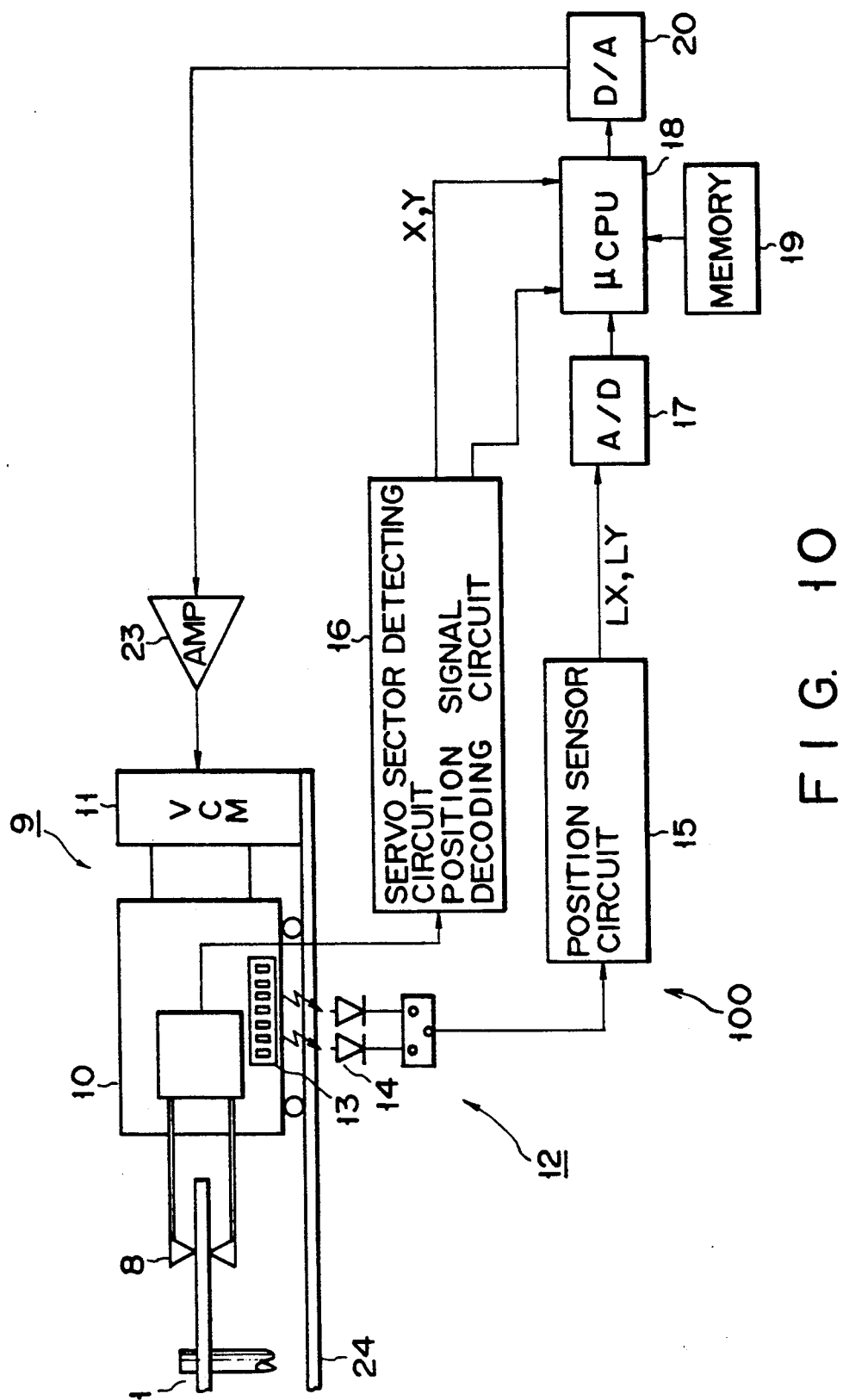
FIG. 10 is a block diagram showing the structure of a head positioning servo system of a disk system according to the embodiment.

FIG. 10 is a block diagram showing the structure of a head positioning servo system of a disk system according to still another embodiment based on the above-described operating principle.

In FIG. 10, a head 8, a head moving mechanism 9 (carriage 10 and a voice coil motor 11) a linear scale 13, and two sets of optical sensor units 14 are as shown in FIGS. 8A and 8B. A positioning sensor circuit 15 constitutes a position sensor 12 together with the linear scale 13 and the optical sensor unit 14, and outputs continuous position signals LX and LY shown in FIGS. 7A and 7B. The position signals LX and LY are input to a μCPU 18 through an A/D converter 17.

A servo sector detecting and position signal decoding circuit 16 decodes dispersive position signals X and Y shown in FIGS. 7A and 7B, illustrating the position of the head 8 to a data track 5 on a disk 1 from the reproduced output of the head 8, and a servo sector detection signal, and outputs them to the μCPU 18.

The μCPU 18 carries out a series of processes as described in the above paragraphs <1> to <5>, finally calculates to obtain the position PP of the head 8 to the data track at each servo sector, obtains a difference between a present position PP and a target track position OP, obtains a seeking distance SD, further reads a desired speed profile stored in a memory to be formed previously in response to the seeking distance SD from the memory, and obtains the desired speed V0 at the present position PP. The actual moving speed VP of the head 8 is obtained by the following formula from the position PB obtained by the previous servo sector and the present position PP.

$$VP = PP - PB$$

The μCPU 18 compares the actual moving speed VP with the desired Speed V0, and feeds back a speed control signal responsive to the difference EV as a control signal to a current amplifier 23 for driving the voice coil motor (VCM) 11 through a D/A converter 20 to control the movement of the head 8.

Each time when the servo sector is detected, the above-described control is repeated, and the head 8 is moved to the vicinity of the target track at a high speed.

The present invention is not limited to the particular embodiments described above. Various modifications may be made without departing from the spirit or scope of the general inventive concept as will be described below.

Figure 11:
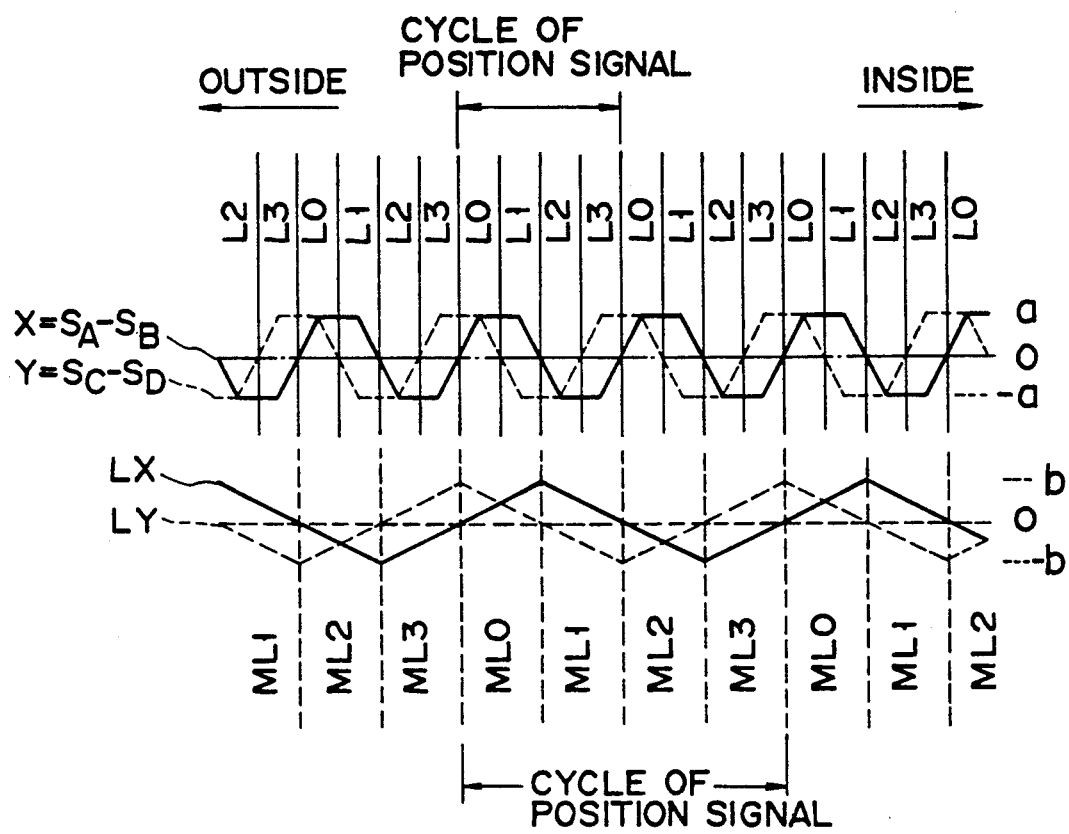
FIG. 11 is a view for explaining a method of obtaining a head position from a position signal having different cycle from that of a position signal obtained from the position sensor shown in FIGS. 7A, 7B and 9.

For example, the cycle of the position signals LX and LY obtained from the position sensor 12 may be that multiplied by an integer number of the cycle of the position signals LX and LY obtained from the servo pattern 4 on the disk 1, and the period of the position signals X and Y may be that multiplied by an integer number of the cycle of the position signals X and Y. For example, if the position of the head is obtained by using the position signals LX and LY from the position sensor having a cycle of twice as large as the cycle of the position signals X and Y obtained from the servo pattern on the disk as shown in FIG. 11, the zones ML0, ML1, ML2 and ML3 in which the head exists are obtained as below by determining the amplitudes of the position signals LX and LY.

$LX \geq 0, LY > 0 \rightarrow ML0$ $LX > 0, LY \leq 0 \rightarrow ML1$ $LX \leq 0, LY \geq 0 \rightarrow ML2$ $LX < 0, LY \geq 0 \rightarrow ML3$ Further, the positions MD0, MD1, MD2 and MD3 ($0 \leq MD < 2$) in the zones are obtained as follows (A) or (B) from the position signals LX or LY.

$$\begin{aligned}
ML0{:}MD0 &= 2 \times LX/b \\
ML1{:}MD1 &= 2 \times (1 - LX/b) \\
ML2{:}MD2 &= 2 \times (-LX/b) \\
ML3{:}MD3 &= 2 \times (1 + LX/b)
\end{aligned} \quad (A)$$

$$\begin{aligned}
ML0{:}MD0 &= 2 \times (1 - LY/b) \\
ML1{:}MD1 &= 2 \times (-LY/b) \\
ML2{:}MD2 &= 2 \times (1 + LY/b) \\
ML3{:}MD3 &= 2 \times LB/b
\end{aligned} \quad (B)$$

where ±b is the amplitude values of the position signals LX and LY.

The moving speed V of the head is obtained as $V_{S=n+1} = P_{S=n+1} - P_{S=n}$ from the $P_{S=n+1}$ and $P_{S=n}$, and may be used as $V_{S=n+1} = P_{K+m} - P_K$ from the positions $P_{K+m}$, $P_K$ obtained from the position signals LX and LY. Further, the position signals LX and LY are differentiated to form a speed signal, and a speed V may be obtained directly.

Figure 12:
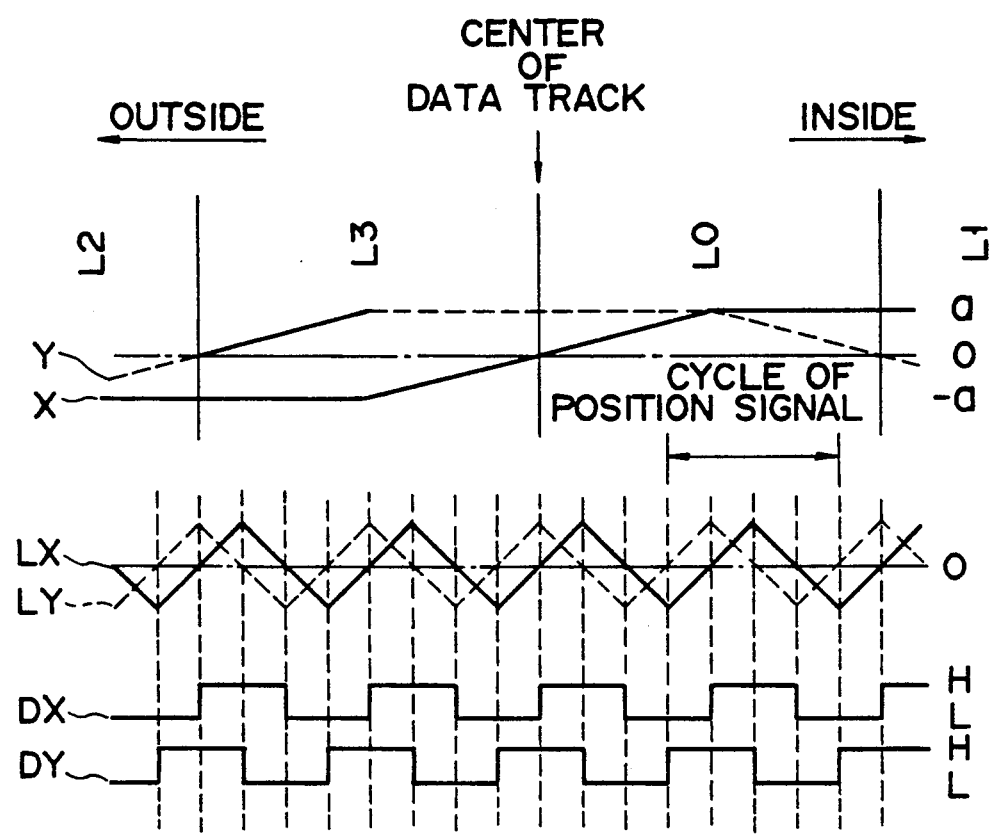
FIG. 12 is a view for explaining another method of obtaining a head position from a position signal obtained from another position sensor.

Then, other method of obtaining the position of a head from position signals LX and L obtained from the position sensor 12 of FIGS. 8A and 8B will be described by referring to FIG. 12. First, the position signals LX and LY are binarized at a 0 level to obtain digital signals DX and DY. The rises/falls of the signals DX and DY generated upon movement of the head are counted to detect the position of the head. In order to raise the resolution of the position of the head, position signals LX and LY having a cycle shorter than that of the position signals X and Y obtained from the servo pattern are used.

Figure 13:
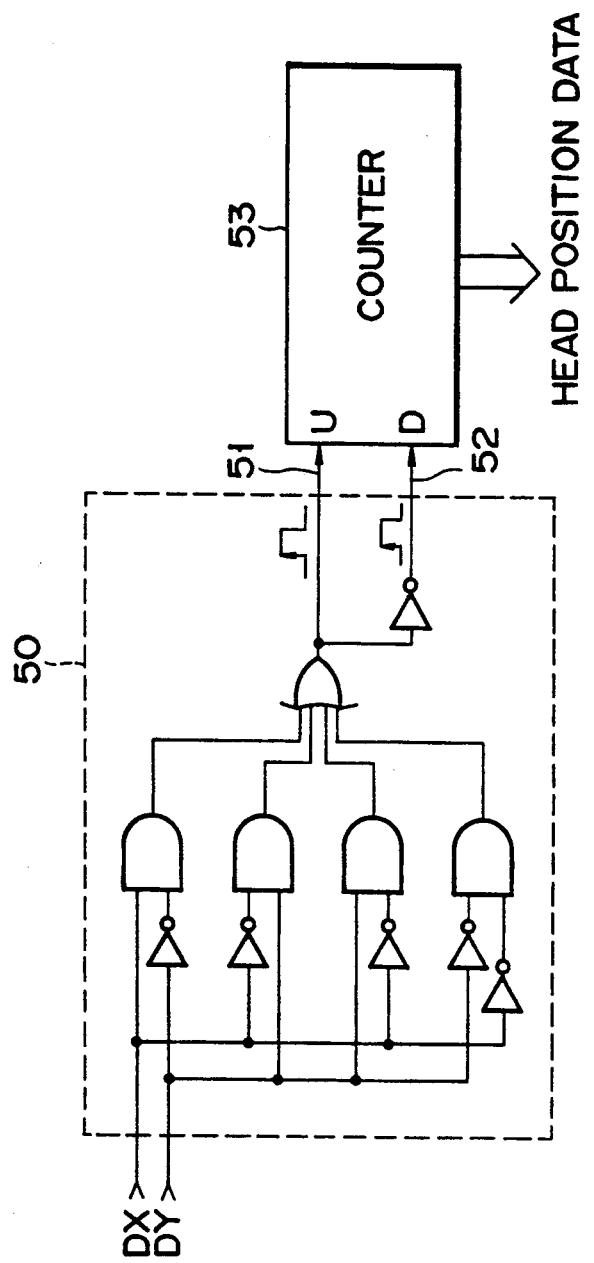
FIG. 13 is a view showing a pulse generator for a track counter for generating each time when a track is crossed in a head position detecting method of FIG. 12.
Figure 14:
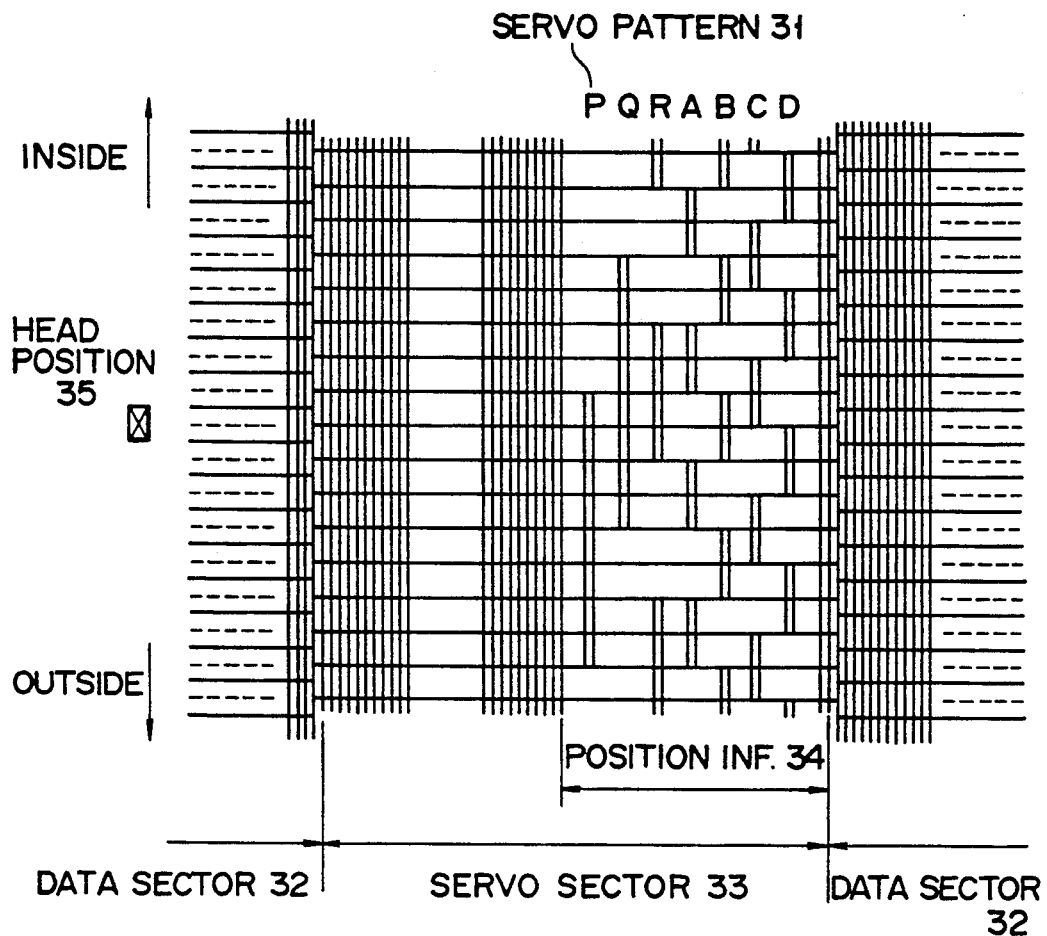
FIG. 14 is a view of a servo pattern formed on a disk according to prior art.

Up/down counting of the signals DX and DY in the moving direction of the head are carried out by a circuit shown in FIG. 13. When the head is moved to the inside of the disk, a count up/down pulse 31 is generated from a count up/down pulse generator 50. When the head is moved to the outside of the disk, a count up/down pulse 32 is generated from the count up/down generator 50. These pulses 31 and 32 are respectively input to the up count input terminal U and down count input terminal D of a position detecting up/down counter 53. The output data of the counter 53 indicates the movement of the head at ⅛ track pitch for one count.

Instead of the position sensor 12 as shown in FIGS. 8A and 8B, a position sensor which uses a CCD, etc., for obtaining a linear position signal in a movable range of the head may be employed.

In addition, various modifications may be made without departing from the spirit or scope of the general inventive concept of the invention.

According to the embodiment described above, the following effects are obtained. In addition to the position information from the servo pattern, the information for following up the head to the data track as the servo pattern is included at the minimum limit together with the information of the moving distance obtained by the moving distance detecting means, and the position and speed of the head can be detected accurately even if the head is moved at a high speed while employing the servo pattern having less servo information amount obtained only in the narrow range of the region for unitarily identifying the position of the head.

Therefore, servo information space factor is reduced, high data format efficiency can be obtained, and seeking of higher speed can be carried out.

Since the position of the head and the speed detecting ability do not depend upon the number of the servo sectors, seeking ability may be designed independently irrespective of the number of the sectors.

Figure 16:
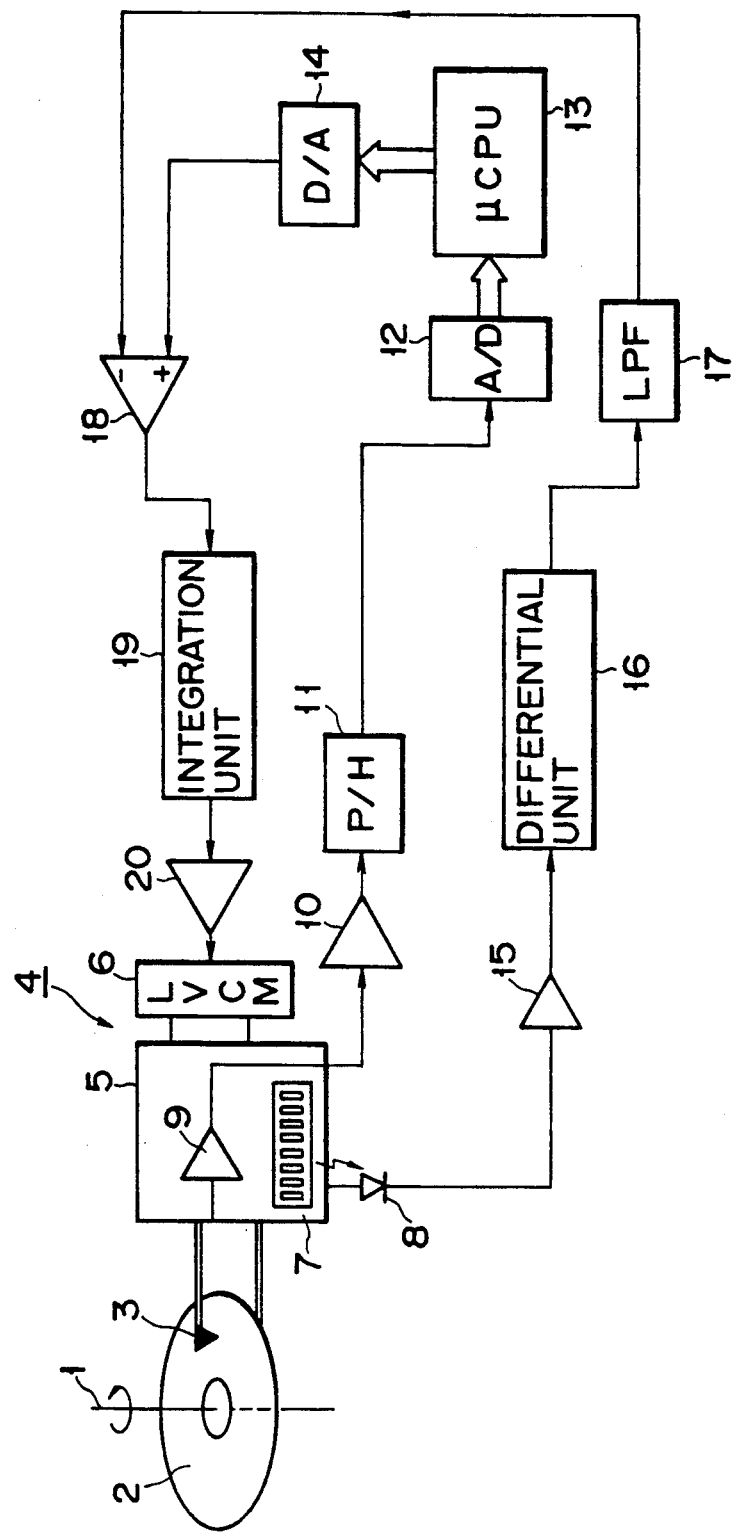
FIG. 16 is a block diagram showing the structure of a magnetic disk system according to another embodiment of the present invention.

FIG. 16 is a block diagram showing the structure of a "head positioning system" of a disk system according to still another embodiment of the present invention.

A disk 2 is rotatably driven by the revolution of a spindle 1 by a spindle motor (not shown). The disk 2 is, for example, a magnetic hard disk or a magnetic floppy disk, and data is recorded and reproduced by a head 3.

Figure 17:
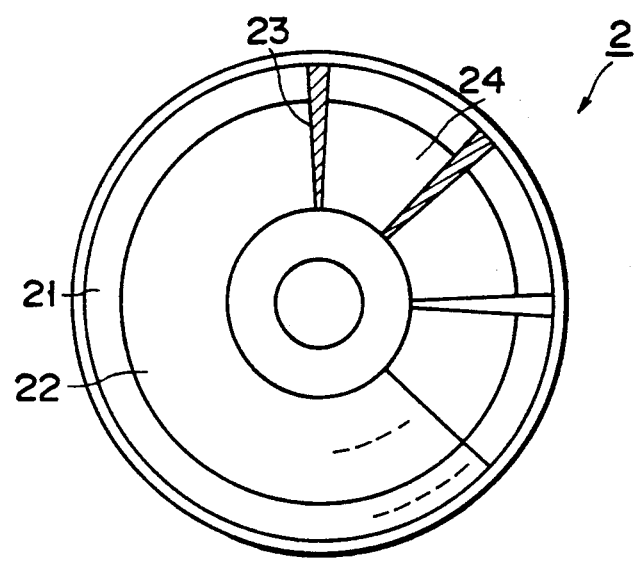
FIG. 17 is a plan view schematically showing disposition of a servo sector on a disk of a sector servo type.

The disk 2 is constructed in the same manner as the disk corresponding to a known sector servo type as shown in FIG. 17. Therefore, the detailed description of the disk 2 will be omitted.

Figure 18:
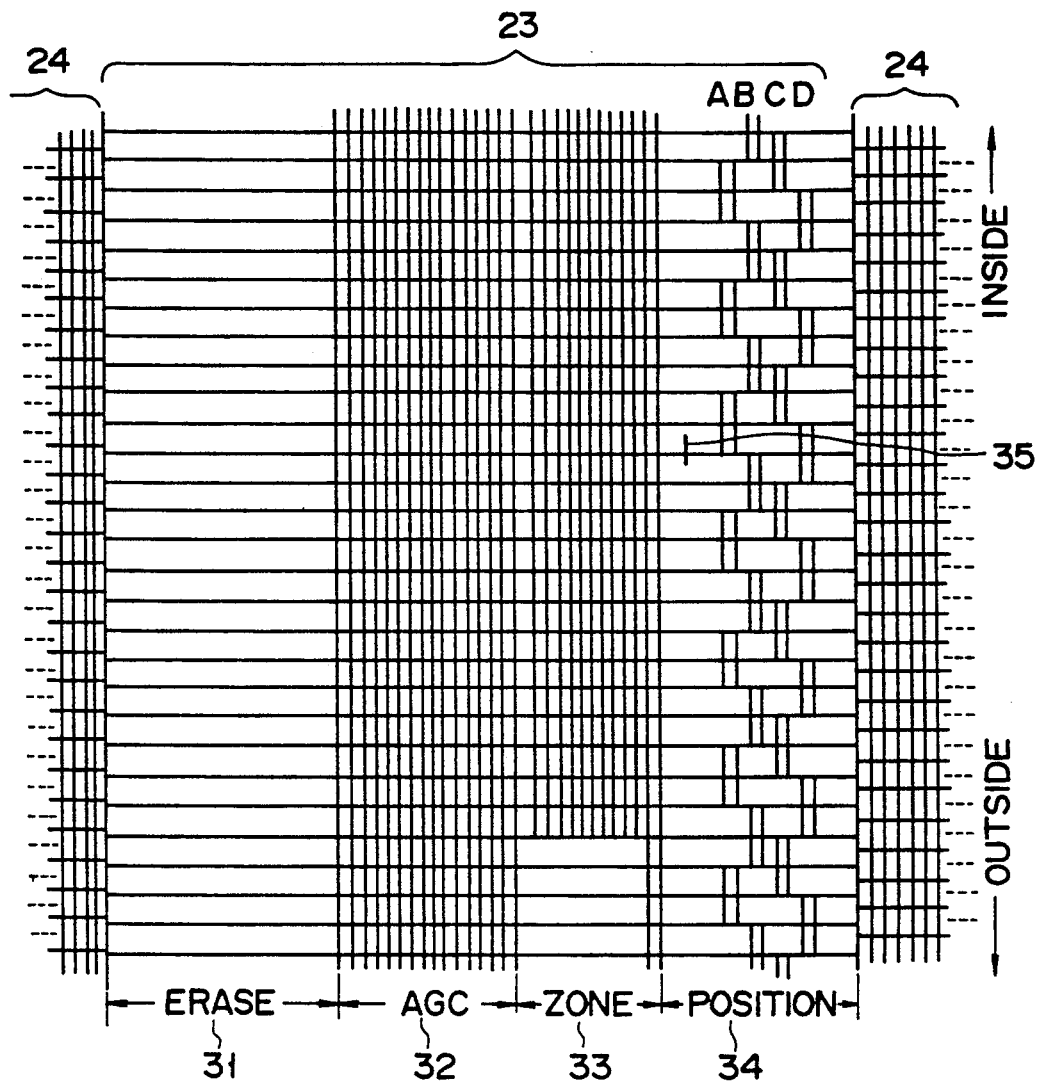
FIG. 18 is a view schematically showing the structure of a servo pattern in a servo sector.

As shown in FIG. 18, on a servo sector 23 (as shown in FIG. 17), an erased portion 31 for detecting the servo sector 23 itself, an AGC portion 32, a guard zone 21 (in FIG. 17), a zone detecting portion (ZONE) 33 for determining the data zone 22 (FIG. 17), and a position portion (POSITION) 34 in which the servo pattern is written are arranged.

Figure 19:
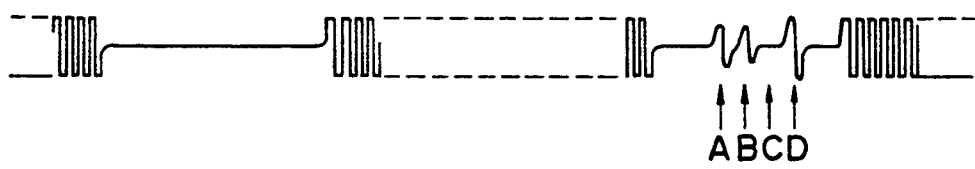
FIG. 19 is a view showing a reproduced signal waveform from a servo sector on a disk.

Therefore, to detect the servo sector 23 by the head 3, when the gap 35 of the head is disposed at the center of the servo track (in FIG. 18), the center of the gap 35 may be fundamentally brought into coincidence with the center of the next data track in response to the revolution of the spindle 1. More specifically, the head sequentially reproduces signals recorded on the disk as shown in FIG. 19. At this time, four signals A, B, C and D obtained by reproducing the servo pattern from the position portion 34 are peak-held as will be described later, A-B, C-D are calculated to generate a head position error signal, and controlled so that the gap 35 is passed through the center of the track (i.e., the above-described values of the A-B and C-D become zero (0)).

Then, the structure of the "head positioning system" in FIG. 16 will be described by referring to a control block diagram of FIG. 20.

In FIG. 16, a head moving mechanism 4 moves the head 3 in the radial direction of the disk 2 in accordance with the control signal. For example, the head moving mechanism 4 has a carriage 5 for placing and moving the magnetic head 3, and a linear voice coil motor (LVCM) 6 for moving the carriage 5 in the radial direction of the disk 2.

A linear scale 7 is provided in the carriage 5 in the head moving mechanism 4, and an optical sensor 8 provided in the vicinity of the carriage 5 for reading the linear scale 7, detecting the relative position of the carriage 5 to a base (not shown) to which the spindle 1 is fixed, and outputting a position signal of continuous signals, is provided. An optical position sensor 78 in FIG. 20 has the linear scale 7 and the optical sensor 8. The mounting positions of the linear scale 7 and the optical sensor 8 will be described later.

After the signal reproduced by the head 3 is amplified by a preamplifier 9, the signal is input to a μCPU 13 through an AGC amplifier 10, a peak holding circuit 11, and an A/D converter 12. The A/D converter 12 samples the output of the peak holding circuit 11 on each servo sector 23, and digitizes the peak holding values A, B, C and D of the four signals obtained by reproducing the servo pattern of the position portion 34 of the disk.

The μCPU 13 calculates A-B and C-D from the output of the A/D converter 12 to obtain a position error signal indicating the error of the relative position of the head 3 to a track on the disk 2, and outputs a basic control signal (hereinafter referred to as a "basic control signal") based on the position error signal by a known compensating calculation as a digital value. The digital value of the basic control signal is converted into an analog signal by a D/A converter 14.

On the other hand, a position signal to be output from the optical sensor 8 is input to a differential unit 16 through an amplifier 15, and differentiated twice. The signal from the optical sensor 8 is continuous corresponding to the relative variation in the carriage 5 to the base. When this signal is differentiated once, a speed signal corresponding to the moving speed of the carriage 5 is obtained. When the signal is differentiated twice, an acceleration signal is obtained.

The differential output signal (i.e., an acceleration signal) to be calculated by the differential unit 16 is input to a low pass filter (LPF) 17 for suppressing a high frequency component (i.e., noise component) strengthened by the differentiation.

The analog basic control signal from the D/A converter 14 is input to the non-inverting input terminal of an operational amplifier 18, and the output signal from the low pass filter 17 is input to the inverting input terminal of the operational amplifier 18. Therefore, the operational amplifier 18 obtains a "difference signal" of both the signals. This difference signal is integrated by an integration unit 19, and the output signal of the integration unit 19 is input as a control signal to a drive amplifier 20 for driving the linear voice coil motor 6 of the head moving mechanism 4.

When a disturbance such as an impact, a vibration, etc., is applied to the head moving mechanism 4, a position signal detected by the optical position sensor 78 having the linear scale 7 and the optical sensor 8 is abruptly varied by the impact or the vibration to be applied to the carriage 5. This position signal is amplified by the amplifier 15, and differentiated twice by the differential unit 16 to obtain a large acceleration signal corresponding to the movement of the position due to the impact or vibration of the carriage 5. Since the acceleration signal is input to the operational amplifier 18 through the low pass filter 17, a large difference signal is output from the operational amplifier 18. After the difference signal is integrated by the integration unit 19, the signal is input to the drive amplifier 20. As a result, since a head positioning error generated by a disturbance such as an impact or a vibration, etc., is rapidly suppressed, track follow-up performance and disturbance-proof performance are improve as the result. Elements 502-516 illustrate the various parts of a control system used for controlling the position of the head. The elements in these boxes are standard Laplace control system references. The letters in the boxes, except for S, indicate constants. No further discussion of these elements is made for brevity's sake.

Graphs shown in FIGS. 21A to 21C and 22A to 22C explain various states when an impact is applied as a disturbance to the head moving mechanism 4 (i.e., head positions, disturbances and LVCM currents). FIGS. 21A to 21C show data in prior art having no low pass filter 17, while FIGS. 22A to 22C show data of the embodiment of the present invention, wherein FIGS. A illustrate the positions Y of the head 3, FIGS. B illustrate disturbances RDS, and FIGS. C illustrate the currents IC of the linear voice coil motor 6. As apparent from these drawings, according to the embodiments of the invention, correction of the position error of the head 3 when the disturbance is applied is rapidly carried out as compared with the prior art, and it is understood that the positioning error itself is reduced by several tens of times as large as that of the prior art.

Generally, a noise component of high frequency band except the position signal is contained in the output of the optical sensor 8. Therefore, when the output signal from the optical sensor 8 is differentiated by the differential unit 16, the noise component is strengthened, and there is an apprehension that the characteristic of the head positioning control might be deteriorated. The low pass filter 17 is provided to suppress the high frequency band component of the differentiated output signal from the differential unit 16 so as not to apply such a noise component to the control system.

Figure 23:
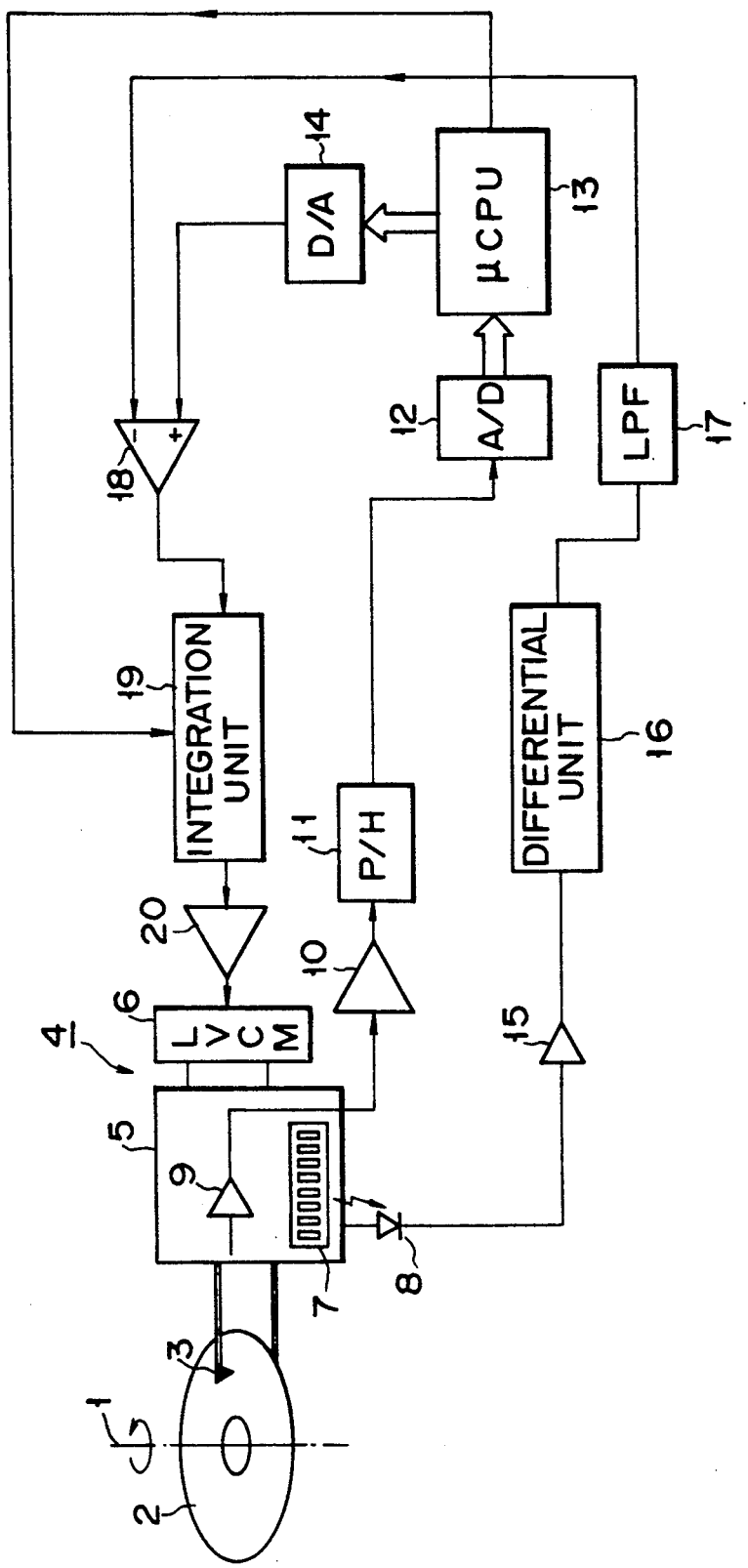
FIG. 23 is a block diagram showing the structure of a disk system according to still another embodiment of the present invention.

FIG. 23 shows still another embodiment of a disk system of the present invention. This embodiment is different from the embodiment shown in FIG. 16 at the point that the integrating operation of an integration unit 19 is set to be controlled by a μCPU 13. The μCPU 13 carries out an open loop control at the maximum acceleration at the time of accelerating the head moving mechanism 4 at seeking time (i.e., when the head 3 is transferred from a certain track to other track on the disk 2), while the μCPU 13 performs a closed-loop control for decelerating the head moving mechanism 4 in accordance with the desired speed VRZ (mark speed) previously provided in a table at the time of decelerating the head.

However, since a large difference signal is continuously applied to the integration unit 19 at the time of the open loop control in the prior art, the integration unit is saturated if the integration is continued. Therefore, when it is switched to the decelerating operation, the head 3 is "overshot", and hence the follow-up performance of the desired speed of the head is largely deteriorated.

In this embodiment, therefore, the integrating operation of the integration unit 19 is stopped during the open loop control at the time of accelerating the head moving mechanism 4. Thus, only the proportional amplification of the difference signal to be output from the operational amplifier 18 is carried out, and the integrating operation of the integration unit 19 is performed during the closed loop control at the time of deceleration. The on/off control of the integration of the integration unit 19 is carried out by a command signal from the μCPU 13. The stop of the integration of the integration unit 19 is performed by stopping the integrating calculation. Since the integration unit 19 is not saturated at the time of the open loop control by controlling as described above, it can be smoothly switched to the closed loop control. Therefore, the head can accurately follow up the desired speed.

When the maximum acceleration is limited by performing the closed loop control even at the time of acceleration so as not to saturate the integration unit 19, there arises a problem in which its seeking time is increased. However, the saturation of the integration unit 19 can be stopped without increasing the seeking time by stopping the integration of the integration unit 19 after the open loop control is carried out at the time of acceleration as in this embodiment.

Figure 24:
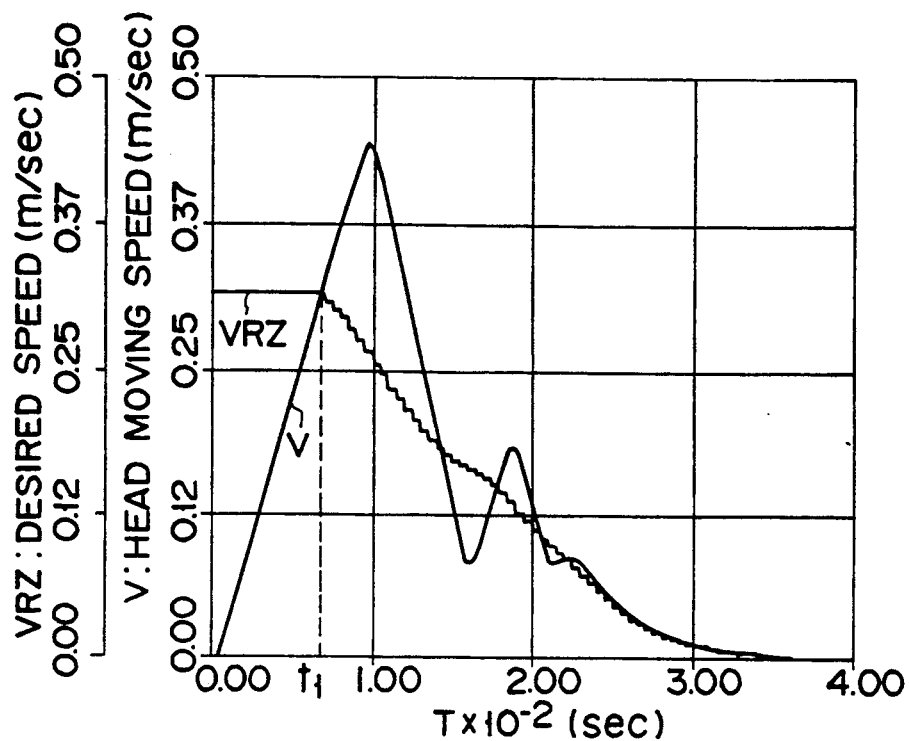
FIGS. 24 and 25 are views showing speed follow-up characteristics of prior art and the present invention.

FIG. 24 shows a graph illustrating relationship between a desired speed VRZ when the integration u it is operated even at the time of open loop control and the time change of the moving speed V of the head. In FIG. 24, the desired speed VRZ becomes a constant value at the time of starting the speed control (i.e, accelerating), and the open loop control is carried out during the acceleration period. It is switched to the deceleration from the time point $t_1$ when the head moving speed V coincides with the desired speed VRZ. The closed loop control is carried out during the deceleration period. In this case, even if the desired speed VRZ is considerably smoothly set as shown in FIG. 24 (e.g., acceleration/deceleration ratio: 4), the head 3 is overshot, and the head moving speed V largely exceeds the desired speed VRZ. This overshoot is caused by the saturation of the integration unit 19 at the time of open loop control as described above.

Figure 25:
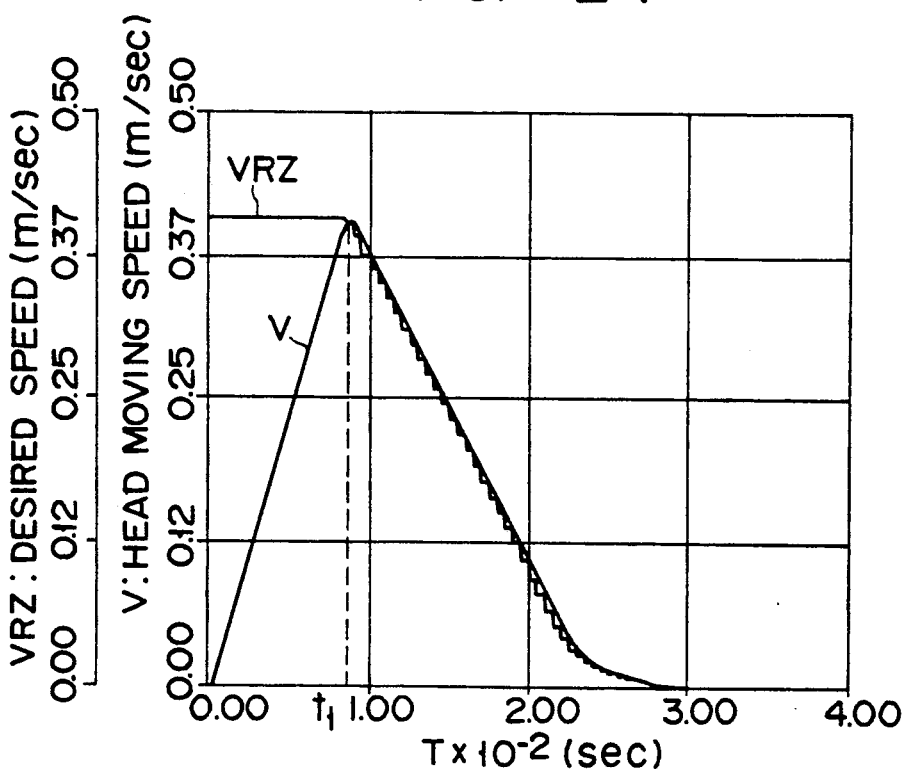

FIG. 25 shows a graph illustrating relationship between a desired speed VRZ when the integration unit is stopped at the time of the open loop control and the time change in the moving speed V of the head 3 as still another embodiment of the present invention against the above-described prior art. The desired speed VRZ becomes a constant value at the time of starting the speed control, similarly to FIG. 24. The open loop control is carried out during this acceleration period, and the integration unit 19 is stopped under the control of the μCPU 13. The head moving speed V is shifted to deceleration from the time point $t_1$ when the head moving speed V coincides with the desired speed VRZ in such a state, and the closed loop control is carried out. At this time, the integration unit 19 is started under the control of the μCPU 13. In this case, since the integration unit 19 is not saturated at the time of the open loop control, even if the desired speed VRZ is set so as to be abruptly decelerated as shown in FIG. 25 (e.g., acceleration/deceleration ratio: 1:2), the head 13 is not overshot. Therefore, since the head moving speed V can preferably follow up the desired speed VRZ, a high speed seeking can be performed.

The present invention is not limited to the particular embodiments described above. Various modifications as the following paragraphs (1) to (4) may be made without departing from the spirit and scope of the general inventive concept of the present invention.

(1) In the above-described embodiment, the position of the carriage 5 is detected by the optical sensor 8. However, an electric sensor such as an electrostatic capacity type or other sensor may be employed instead.

(2) In the above-described embodiment, the position signal is differentiated twice in the differential unit 16. However, the differentiations may be twice or more. For example, if the signal is differentiated three times, the change rate of the acceleration is obtained. However, in this case, it is preferable to convert the basic control signal to a signal corresponding to the change rate of the acceleration.

(3) In the above-described embodiment, the case of the sector servo type has been described. However, the invention may be applied to a magnetic disk system of so-called "servo surface servo system" having an exclusive use servo surface in addition to the data surface. In this case, instead of the position signal from the position detecting means provided in the head moving mechanism, the position signal obtained from the servo information on the exclusive use servo surface may be employed. The position signal is input to the differential unit similarly to the previous embodiment, and differentiated twice or more.

(4) In the above-described embodiment, a main circuit for guiding the head on a predetermined track on the basis of the servo information on the disk is formed of the digital circuit by using the A/D converter 12, the μCPU 13 and the D/A converter 14, and the sub circuit having the differential unit for differentiating twice or more the position signal and the low pass filter for suppressing the high frequency component of the differentiation detection signal is formed of the analog circuit. However, the latter sub circuit may be formed of the digital circuits by using an A/D converter, a digital differential unit, a digital low pass filter and a D/A converter. In this case, since it is necessary to detect the acceleration or its change rate in the sub circuit, the sampling cycle of the A/D converter in the sub circuit is preferably the sampling cycle or less of the A/D converter 12 in the main circuit.

When both the main and sub circuits are formed of the digital circuits, the integration unit 19 is also formed of the digital circuit, and a D/A converter may be disposed at the output side of the integration unit.

Still another embodiment of the invention in terms of the mounting positions of the scale 7 and the optical sensor 8 will be described in detail by referring to FIGS. 26 to 41.

Figure 41:
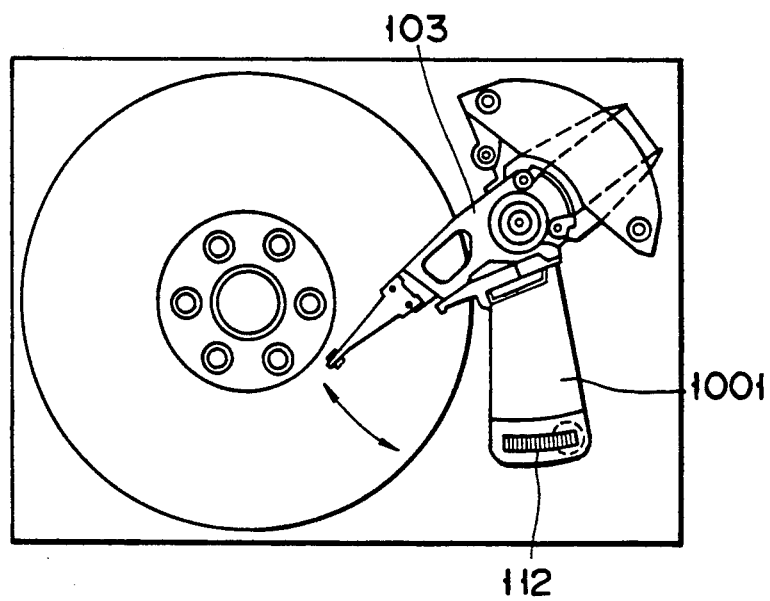
FIG. 41 is a plan view showing the structure of a head positioning unit of a conventional magnetic disk apparatus.

Since the conventional head positioning system improves a "disturbance suppressing characteristic" without raising its servo band and directly detects a disturbance to be applied to the head positioning system to compensate it, it is necessary to detect the absolute position of the head for a base plate attached with the head positioning system. FIG. 41 shows the structure of a conventional head positioning system for detecting the above-described absolute position of the head. The head positioning system in FIG. 41 uses a transmission type optical encoder to detect the absolute position of the head. However, when this optical encoder is employed, it is necessary to mount a scale slit 112 at a carriage 103 through an arm 1001 as shown due to the relation of its space. Therefore, the weight of the movable unit of the head positioning device is increased. As a result, there arises a problem in which an accessing speed is delayed. Since the position of the center of gravity is separated from the rotational shaft of the carriage, there also arises a problem that characteristics for a disturbance is deteriorated.

According to the head positioning system of still another embodiment of a magnetic disk system of the present invention, a position sensor of the structure which does not considerably increase the weight of its movable unit is provided.

Figure 26:
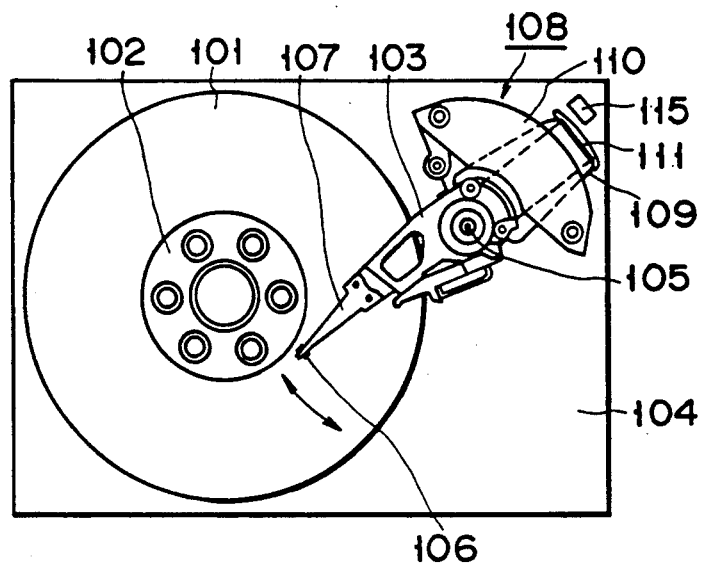
FIG. 26 is a plan view of a magnetic disc system illustrating the first mounting example of a scale and an optical sensor.
Figure 27:
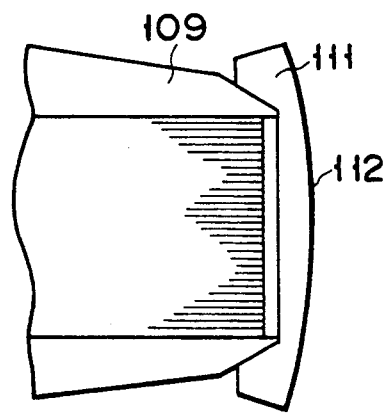
FIGS. 27, 28 and 29 are a plan view, a side view and a rear view showing a reflection block and the structure near the block in FIG. 26.
Figure 28:
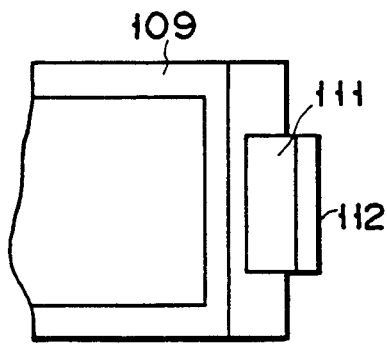

FIG. 26 is a plan view of still another embodiment of a magnetic disk system of the invention using first mounting example of a scale 112 and an optical sensor 115. FIGS. 27 and 28 are a plan view and a side view of the rear end of the head positioning unit in FIG. 26.

Figure 29:
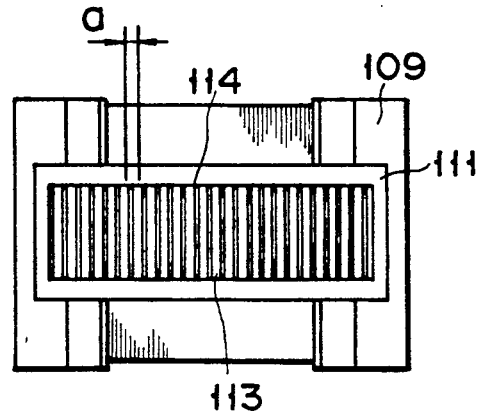
Figure 30:
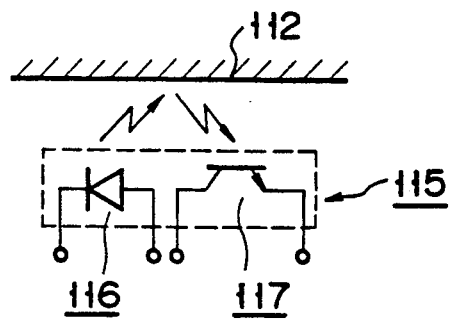
FIG. 30 is a view showing the structure of a position sensor.

A magnetic disk medium 101 is secured to a hub 102, and rotated by a spindle motor (not shown). A carriage 103 is rotatably mounted on a shaft 105 fixed to a base plate 104. A magnetic slider 106 is fixed to the carriage 103 through a suspension 107. A voice coil motor 108 has a coil bobbin 109 in which a coil secured to the carriage 103 is wound, and a stator 110 disposed at a position of the base plate 104 as shown in FIG. 26. A resin reflecting block 111 is fixed to the rear end of the coil bobbin 109 as shown in FIGS. 27 and 28. The reflecting surface 112 of the reflecting block 111 is formed of a surface at a predetermined distance from the rotational shaft of the carriage 103. On the reflecting surface 112, a reflecting portion 113 and an absorbing portion 114 are alternately arranged at a pitch (a constant interval) of equal interval as shown in FIG. 29. The reflecting surface 112 formed as described above may be formed by coating one reflecting surface 112 of the reflecting block 111, for example, with paint for absorbing light and adhering it with a slit formed of a thin plate for reflecting the light.

On the base plate 104, a sensor 115 is disposed at a position as shown in FIG. 26. The sensor 115 has, as shown, for example, in FIG. 30, a light emitting diode 116 and a phototransistor 117 to output an electric signal responsive to the quantity of the reflected light of the light projected to the reflecting surface 112. When the carriage 103 is rotatably moved with the structure described above, the output of the position sensor 115 is obtained as shown by a solid line in the graph of FIG. 31 for the moving distance of the rear end of the coil bobbin 109. Since the ratio of the moving distance of the rear end of the coil to that of the head is formed to be equal to the ratio of the distances from the rotational shaft of the carriage, the moving distance of the head to the base plate is obtained from the output of the sensor 115. The S/N ratio of the output of the sensor 115 can be enhanced by disposing the mask 118 shown in FIG. 32 between the sensor and the reflecting surface. However, the width b of the slit 119 formed in the vicinity of the center of the mask 118 is preferably equal to the half of the pitch a, or smaller than that. In this embodiment, the reflecting block (stator) 111 is formed of resin having light weight and symmetrical with respect to the line for connecting the rotational shaft of the carriage to the head. Therefore, the influence to the performance of the head positioning unit is small.

Figure 31:
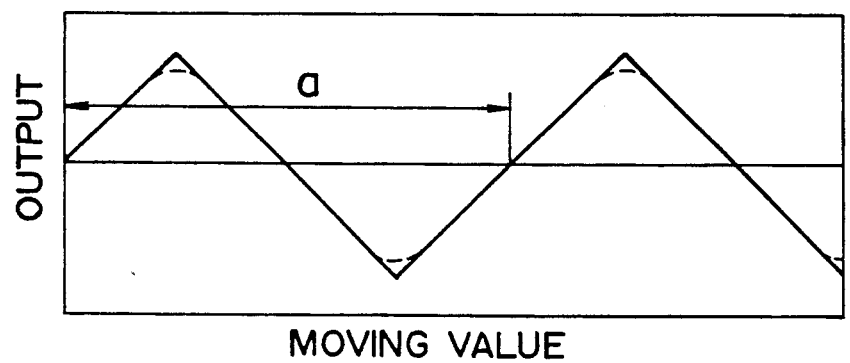
FIG. 31 is a graph representing the output of the position sensor.
Figure 32:
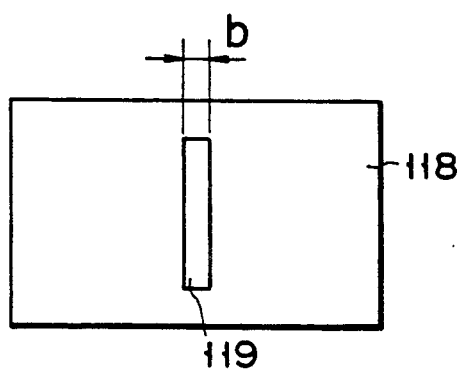
FIG. 32 is a plan view of a mask.
Figure 33:
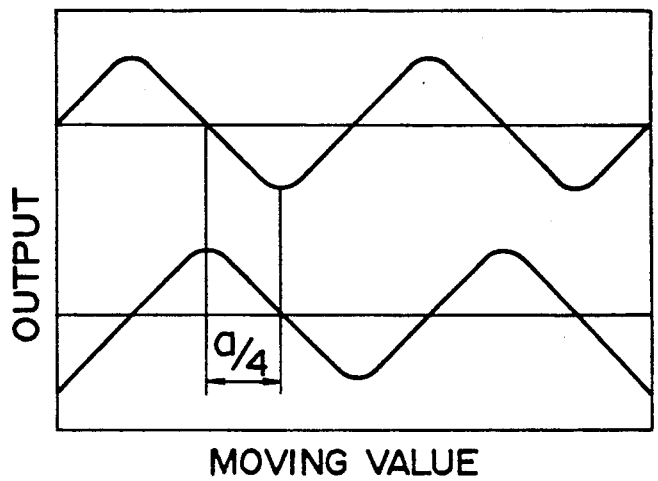

In this embodiment, the output of the sensor 115 might become a quasi-sine wave as shown by a wave line in the graph of FIG. 31, and the linearity between the output of the sensor and the displacement (moving distance) might be collapsed. In such a case, two sensors are mounted, the sensors are deviated by a/4 in the phase of the outputs as shown in FIG. 33 thereby to switch the portions held in the linearity of the outputs, thereby obtaining a correct position signal.

In still another embodiment, the sensors are not deviated, but the reflecting portion and the absorbing portion are deviated by a/4 on the reflecting surface, thereby obtaining the similar effect to the above effect. Outputs having higher linearity may be obtained by employing a plurality of sensors to provide a plurality of outputs deviated in the phases by increasing the number of sensors.

Figure 34:
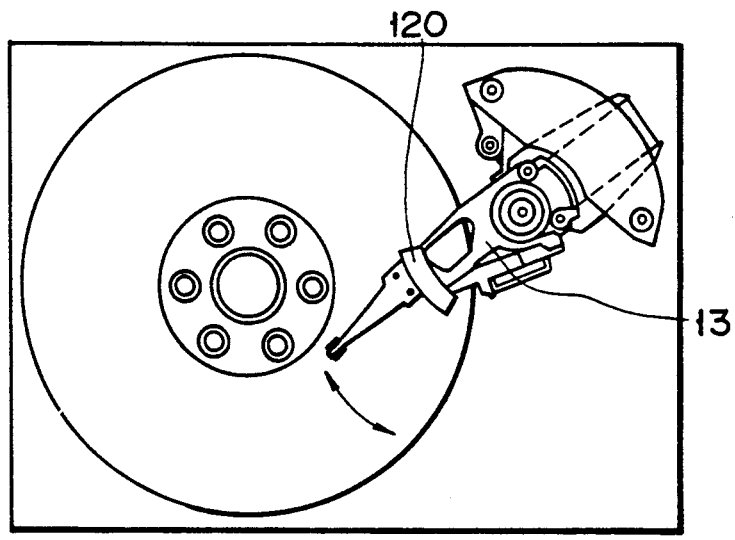

In the embodiments described above, the reflecting surfaces are disposed at the rear end of the coil bobbin. However, the mounting positions are not limited. For example, as shown in FIG. 34, the reflecting surface 120 is mounted in the vicinity of the head mounting portion of the carriage 103, thereby reducing the influence of an error due to the deformation of the coil bobbin.

FIG. 35 is a plan view of still another embodiment of a magnetic disk system using second mounting example of a scale and an optical sensor 8, FIG. 36 is a plan view of a coil of the head positioning unit in FIG. 35, and FIG. 37 is a sectional view of a voice coil motor.

In this embodiment, a magnetic disk medium 101 is fixed to a hub 102, similarly to the first mounting example described above, and rotated by a spindle motor (not shown). A carriage 103 is rotatably mounted on a shaft 105 fixed to a base plate 104. A magnetic head slider 106 is fixed to the carriage 103 through a suspension 107. A voice coil motor 108 has a coil bobbin 109 which is secured to the carriage 103 and in which a coil is wound, and a stator 110 disposed at a position of the base plate 104 as shown in FIG. 35. A movable scale 112 is fixed to a hollow portion formed by the coil 111 of the coil bobbin 109 as shown in FIG. 36. A plurality of moving slits 113 are aligned at an equal interval in the moving direction at a pitch angle $\alpha$ with the shaft 105 as a center on the moving scale 112. The moving scale 112 may be formed by depositing metal on a glass plate or etching a metal plate. A light emitting element 114, a photodetector 115, and a mask 116 are buried in the stator 110 of the voice coil motor 108, as shown in FIG. 37. They are buried in a hole opened in the same direction as the shaft 105 at a position of the stator 110, as shown in FIG. 35. A detecting slit 117 is formed on the mask 116 as shown in FIG. 38. In the structure as described above, the relative positions between the moving slit 113 of the moving scale 112 and the detecting slit 117 of the mask 116 is varied in response to the rotating angle of the carriage 103, and the quantity of the light received by the photodetector 115 of the light radiated from the light emitting element 114 is hence varied. Therefore, the relationship between the rotating angle of the carriage 103 and the output of the photodetector 115 is as shown in the graph of FIG. 39. The width of the detecting slit 117 is preferably the same as that of the slit 113 or smaller than that. In this embodiment, the detecting slit 117 is one, but a plurality of slits may be disposed so as to stabilize an output waveform.

In this embodiment, the output of the photodetector 115 becomes a quasi-sine wave as shown in the graph of FIG. 39, and the linearity between the output and the rotating angle might be collapsed. Therefore, in this embodiment, two photodetectors 115 are provided, the detecting slits 117 are disposed to obtain $\alpha/4$ by deviating the phases of the outputs of the photodetectors 115 as shown in FIG. 40, and a correct position signal can be obtained by switching the portions in which the linearities of the outputs are held. An output of high linearity may be obtained by employing a plurality of photodetectors 115 to provide outputs of the phase deviated from each other.

Various modifications may be made without departing from the spirit or scope of the general inventive concept of the present invention.

According to the embodiments of the present invention, the following effects are obtained. After the position signal is differentiated twice, a difference between the signal suppressed in the high frequency component and the basic control signal obtained by calculating the servo information on the magnetic disk is obtained, and the head moving mechanism is controlled by the signal obtained by integrating the difference signal to improve the track follow-up of the magnetic head when a disturbance such as a vibration or an impact is applied, and response at the time of off track due to the disturbance, thereby correctly positioning the head on the target track.

Further, the saturation of the integration unit at the time of the open loop control is prevented by stopping the integration of the integration unit during the open loop control period at the time of acceleration of the head moving mechanism to eliminate the overshoot in the case of shifting to the closed loop control from the open loop control, thereby improving the follow-up of the head moving speed to the mark speed.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. A disk system comprising:
a disk as a recording medium, and
a disk recording/reproducing apparatus for recording and reproducing data by a head radially movable across said disk by a head moving mechanism;
said disk comprises a first region formed with first servo sectors having first servo information along a data track for recording and reproducing data on said disk, second regions having second servo sectors having second servo information along a servo track, a number of second servo sectors in the second region being equal to a positive integer multiplied by a number of first servo sectors in the first region, and
said disk recording/reproducing apparatus comprises;
position detecting means, placed on a moving portion of said head moving mechanism, for detecting a position of said head and for outputting a position signal representing the position of said head in the radial direction of said disk,
determining means, connected to said position detecting means, for determining "head follow-up information" using said position signal;
memory means for storing said determined "head follow-up information" when said head is passed between the first servo sectors of the first region, and
means for generating "first track follow-up error information" using servo information read from said first servo sector immediately after said head is passed over said first servo sector when said head is positioned on said data track,
means for generating "second track follow-up error information" using a difference between said determined "head follow-up information" determined using said position signal and the "head follow-up information" stored in said memory means, means for controlling said head to follow-up to the data track using said "first track follow-up error information", and said "second track follow-up error information".

2. A disk system comprising a disk as a recording medium, and a disk recording/reproducing apparatus,
said disk comprises servo information written thereon, and,
said head for recording and reproducing data on said disk,
a head moving mechanism for moving said head in the radial direction of said disk in accordance with a control signal,
position error signal obtaining means for representing the position error of said head to a desired track on said disk from the servo information read by said head,
main loop control signal obtaining means for calculating said position error signal,
position detecting means for obtaining a position signal indicating the position of said head in the radial direction of said disk,
means for obtaining a differentiated output signal by differentiating twice or more the obtained position signal,
filter means for obtaining an output signal suppressing a high frequency component of the differentiated output signal,
means for obtaining a difference signal between an output signal of said filter means and said basic control signal, and
integrating means for integrating the difference signal to obtain a control signal.

3. A disk system according to claim 2, further comprising:
control means for setting, when the head is moved from one of said tracks on the disk to another of said track, deactivating the integrating operation of the integrating means for integrating the difference signal between the output signal of the filter means and the main loop control signal when accelerating the head moving mechanism to control under an open loop control at the highest speed, and activating the integrating operation of the integrating means when decelerating the head moving mechanism to control under a closed loop control for decelerating according to a mark speed.

4. A disk system, comprising:

a disk having servo sectors which have respective servo patterns for indicating a position on said disk where respective ones of said servo sectors are located, a head for reading said disk;

head position decoding means for decoding a position of said head by reading said servo patterns on said disk;

head moving distance detecting means for detecting an amount of head movement per a predetermined period of time, said predetermined period of time equal to or less than a time period required to move said head when a position of said head is at worst position, said worst position having a predetermined maximum;

head position calculating means for calculating a position of the head by;

presuming a position of the head by presuming the head is located at one of said data tracks when a next one of said servo sectors is detected by said head position decoding means after using the detected amount of head movement per a predetermined time period detected by said head moving distance detecting means; and calculating a position of the head from the presumed position of the head and head position information obtained from the servo pattern in the next of said servo sectors; and seeking means for a seeking, at a predetermined speed, a target one of said tracks by controlling a movement of the head according to a difference between a position of said target tracks and said calculated position of the head.

5. A disk system according to claim 4, wherein said head moving detecting means comprises means for determining said predetermined period of time each time one of said sectors is detected.

6. A disk system according to claim 4, wherein said head is arranged on and movable by a unit comprising:
a carriage mounted rotatably on a shaft fixed to a base plate through a suspension,
a voice coil motor comprises;
a coil bobbin being secured to said carriage and being wound by a coil,
a stator disposing at a position of said base plate,
a movable scale being fixed to a hollow portion formed by a coil of said coil bobbin, and
a plurality of moving slits disposed at equal intervals along a moving direction.

7. A disk system according to claim 6, wherein said head moving detecting means comprises a position sensor for detecting a position of said head, including:
a light emitting diode and a phototransistor to output an electric signal responsive to a quantity of reflected light of light projected to a reflecting surface, said position sensor being symmetrical with respect to a line for connecting said rotational shaft of said carriage to said head.

* * * * *